(12) United States Patent (10) Patent No.: US 7,858,130 B2
Malenke et al. (45) Date of Patent: Dec. 28, 2010

(54) AUTOMATED SYSTEM FOR HANDLING FOOD PRODUCTS

(75) Inventors: Mark E. Malenke, Sun Prairie, WI (US); Tod W. Heleniak, Green Bay, WI (US); Brian Tomac, Depere, WI (US); David Hess, Green Bay, WI (US); Scott Adler, Green Bay, WI (US)

(73) Assignee: Nestec S.A., Vevey (CH)

( * ) Notice: Subject to any disclaimer, the term of this patent is extended or adjusted under 35 U.S.C. 154(b) by 1612 days.

(21) Appl. No.: 11/130,271

(22) Filed: May 17, 2005

(65) Prior Publication Data

US 2006/0263181 A1 Nov. 23, 2006

(51) Int. Cl.
*A01K 43/00* (2006.01)
*A47J 27/62* (2006.01)
*B65G 65/34* (2006.01)

(52) U.S. Cl. ............ 426/231; 414/418; 99/327

(58) Field of Classification Search ........... 99/326–333, 99/352–355, 348, 337–340, 386, 443 C, 444–450, 99/467–479, 450.1–450.8; 221/175, 150 A, 221/221; 222/161–164, 146.2; 426/289–296, 426/512–518, 231; 414/418, 744.5, 277, 414/281, 792, 790; 271/14, 93, 98, 106, 271/145

See application file for complete search history.

(56) References Cited

U.S. PATENT DOCUMENTS

| | | | | |
|---|---|---|---|---|
| 3,735,692 A | * | 5/1973 | Marchignoni | 99/353 |
| 3,744,649 A | * | 7/1973 | Ward, Jr. | 414/788.7 |
| 3,941,048 A | * | 3/1976 | Oe et al. | 100/215 |
| 5,012,726 A | * | 5/1991 | Fehr et al. | 99/450.6 |
| 5,113,754 A | * | 5/1992 | Robinson et al. | 99/326 |
| 5,117,749 A | * | 6/1992 | Bakker | 99/450.1 |
| 5,121,677 A | * | 6/1992 | Le Claire et al. | 99/357 |
| 5,243,899 A | | 9/1993 | Moshier et al. | |
| 5,409,721 A | | 4/1995 | Rademaker | |
| 5,630,358 A | * | 5/1997 | Patel | 99/349 |
| 5,921,170 A | * | 7/1999 | Khatchadourian et al. | 99/349 |
| 5,997,924 A | * | 12/1999 | Olander et al. | 426/296 |
| 6,245,370 B1 | | 6/2001 | Pilati et al. | |
| 6,546,847 B2 | | 4/2003 | Pilati et al. | |
| 6,672,203 B1 | | 1/2004 | Tomatis | |
| 2006/0182607 A1 | * | 8/2006 | Clark et al. | 414/744.5 |

* cited by examiner

*Primary Examiner*—Quang T Van
(74) *Attorney, Agent, or Firm*—K&L Gates LLP

(57) ABSTRACT

A system and method are provided for handling food products whereby stacked food products can be mechanically singulated or singulated product not on pitch can be dispensed individually at a regular pitch onto transport system carrying the food products to a subsequent process unit or units in an automated and essentially labor-free manner. The automated handling system may be used advantageously on stacks of pizza crusts, among other food product types.

19 Claims, 26 Drawing Sheets

AUTOMATED SYSTEM FOR HANDLING FOOD PRODUCTS

FIELD OF THE INVENTION

This invention relates to automated handling of food products, and more particularly to an automated system and method for handling stackable products such as pizza crusts.

BACKGROUND OF THE INVENTION

Pizza generally comprises a sheet of leavened dough, baked with a topping including one or more of tomato sauce, cheese, seasoning, oil, vegetable, meat, etc. Frozen pizzas are popular ready-to-prepare food products which conveniently may be eaten after a brief heating period performed by microwave heating and/or oven baking. In high volume production of frozen pizzas, pizza crusts are formed from dough, then chilled for freshness in an unbaked or partially-baked (par-baked) condition, then transported to a topping dispenser to receive topping materials before packaging and distribution.

Mechanized conveying systems have been used in part to transport untopped pizza crusts as individual units from crust making operations to topping dispensing operations at a manufacturing facility. However, manual labor has been relied upon to facilitate and monitor the handling and transport of the pizza crusts. Pizza crusts may be handled as individual units after crust formation until topped, or accumulated in stack form one or more times before the pizza crusts are fed to a topping dispenser. Stacking the pizza crusts helps to ensure an ample supply close to downstream topping operations. Preferably, pizza crusts would be individually feedable from a supply stack on demand to supply a topping dispenser or other downstream processing station in a uniform, non-interrupted manner.

In the past, significant manual labor required to un-stack and singulate the crusts. It is, of course, undesirable for the structure or appearance of the crusts to be damaged during handling, and care must therefore be taken to avoid damaging the crusts as by excessive distortion or creation of significant discontinuities Pizza crusts that have been stacked have a tendency to adhere to each other, requiring controlled manipulations to separate adjoining crusts without damaging them. Substantial manual labor has been employed to transfer loose crusts from a stack to or singulated crusts from the bakery to a conveyor or other transport system used to advance the crusts towards a topping station or other processing station designed for throughput of singulated crusts.

There is a need for labor-saving automated systems for handling and transporting pizza crusts or other stackable food products especially in food processing environments between formation and downstream production operations.

SUMMARY OF THE INVENTION

A system is provided for handling food products wherein stacked food products can be mechanically singulated and properly buffered, or singulated product can be properly buffered, prior to dispensing individually at a regular (uniform) pitch onto a transport system carrying the food products to a subsequent process unit in an automated and essentially labor-free manner.

In one embodiment, a system for handling stacked food products is provided comprising a unique combination of a fluffer assembly, unstacker assembly, and an accumulator assembly. The fluffer assembly comprises an engagement surface adapted for making lateral and vertical movement relative to a stack of food products operable to compressively contact a side portion of the stack and effective to bend and separate edge portions of adjoining food products while retained on an opposite thereof by a separate support member.

The unstacker assembly comprises a loader for receiving a fluffed stack of food products including a lifter operable to vertically raise the stack through predetermined increments of distance. It also includes a picking mechanism including a pick head rotatably mounted on a rotary shaft, and respective rollers arranged on opposite ends of the rotary shaft, and the pick head including at least one suction device operable for releasably applying suction to an edge portion of a food product resting on top of the stack of food products operable to peel a single food product from the top of the stack during rolling movement of the pick head over the food product and releasably hold the peeled food product until released by temporarily relieving the suction. The unstacker assembly also has lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product into contact with a transfer device operable to transfer the food product to a conveyor. The an accumulator assembly is operable for temporarily collecting a plurality of the food products received via the conveyor supplying products discharged from the unstacker assembly or directly from a transport mechanism previously loaded with singulated product and dispensing them individually at an approximately regular pitch onto another conveyor which transports food products individually to a subsequent handling unit.

In one embodiment, individual unstacked crusts are directly fed to an accumulating unit for accumulating and transferring/dispensing them individually at an approximately regular pitch onto another conveyor or transport device which transports crusts individually to a subsequent handling unit for pizza assembly. For instance, individual unstacked warm or cooled crusts may be fed directly to an accumulator assembly as the primary transport system. In one embodiment, frozen crusts are fed directly into an accumulator assembly, as they are generally too rigid for the fluffing operation or the particular manner of unstacking as exemplified herein, according to other embodiments of this invention where crusts are bent out of plane. Excess crusts (e.g., crusts exceeding the throughput capacity of a downstream topping unit) may be diverted from the direct transport line and stacked and stored until used in pizza assembly. In warm crust stacks which have been allowed to cool before further processing, adjacent crusts have a tendency to stick together. These stacks are fluffed, unstacked, and accumulated/dispensed at regular pitch for transport to a topping unit for pizza assembly. In another embodiment, warm (uncooled) stacks of crusts are introduced directly into an unstacker assembly for unstacking without needing a prior fluffing treatment, and then are accumulated/dispensed at regular pitch for transport to a topping unit. A warm stack of crusts that has not been allowed to pre-cool generally does not requiring pre-fluffing before unstacking, although that additional treatment is not excluded either.

In one embodiment, the invention provides a system and method for automating handling of untopped pizza crusts. Manual labor requirements otherwise needed for transferring stacks of untopped pizza crusts from a bakery to a topping station are significantly reduced or even completely eliminated. The invention, however, has broader application than pizza crusts alone, and may be applied to other food products, e.g. products such as pita bread and other flat bread products.

The figures are not necessarily drawn to scale. Similarly numbered elements in different figures represent like features unless indicated otherwise.

DETAILED DESCRIPTION OF THE PREFERRED EMBODIMENTS

Figure 1:
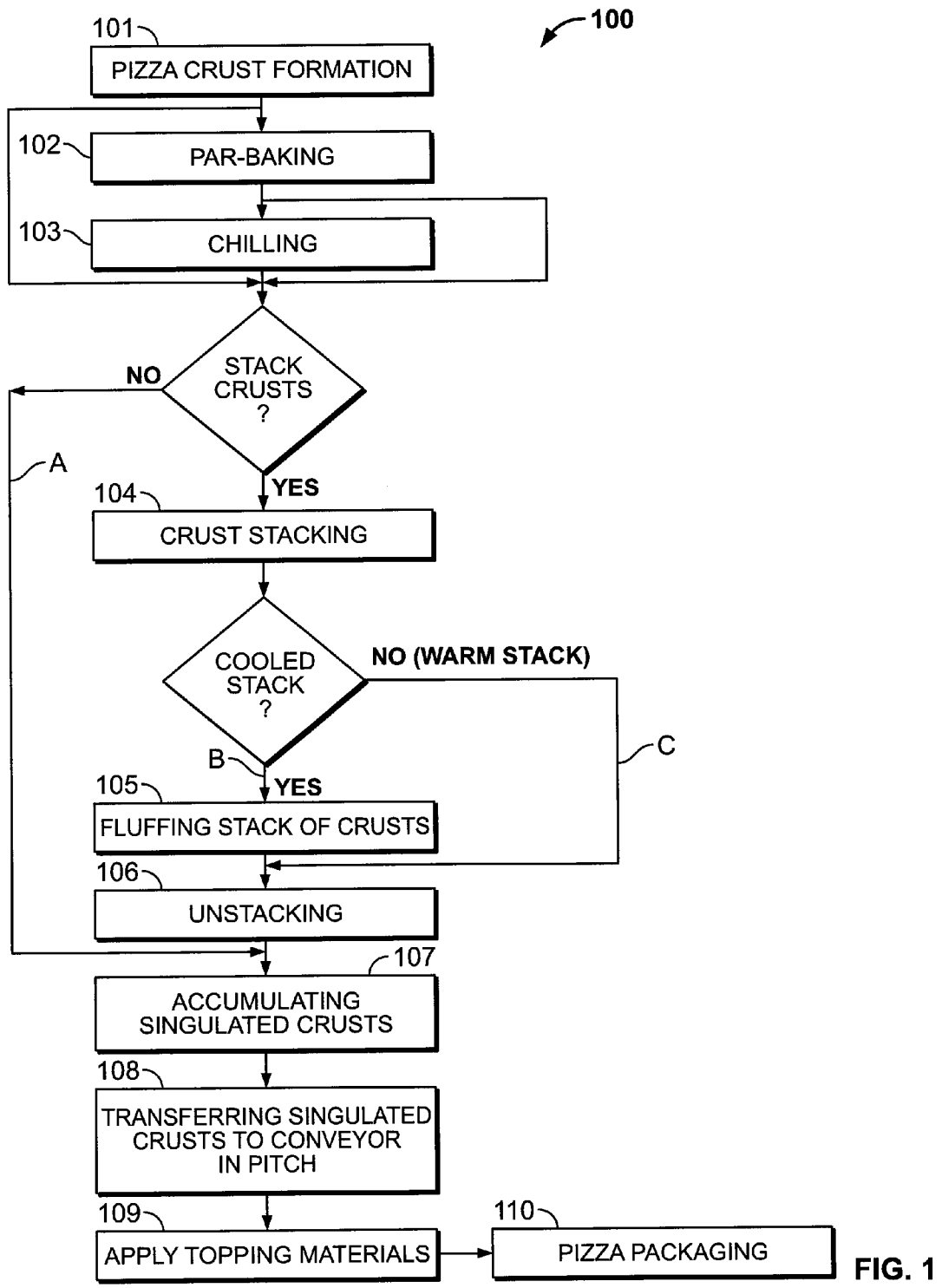
FIG. 1 is a flow chart of a general scheme for producing ready-to-prepare pizzas, which includes handling pizza crusts in an automated manner according to an embodiment of the invention.

Referring to FIG. 1, a general scheme 100 is shown for production of ready-to-prepare pizzas, which includes handling of pizza crusts in an automated manner according to an embodiment of the invention. In this embodiment, pizza crusts are mechanically handled in a labor-saving manner before being topped and packaged as a ready-to-prepare pizza. While an embodiment of the invention is described below by reference to the handling of pizza crusts, the invention also has broader application to include other types of food products.

As generally known, the main components of a pizza or pizza pie include a pizza crust, sometimes referred to as a pie shell, and toppings. The topping materials typically include a tomato-based sauce and cheese, although other topping materials also may be included, such as seasonings, meats, and vegetables, etc. The crust serves as the basic support network for the other components and contributes to the texture and flavor of the food product. As also known, pizza crusts may be formed from mixed and proofed dough, which is shaped into relatively flat sheet form and cut into discrete portions, which often have a circular or squared shape (101). Pizza crusts may be partially-baked (par-baked) after formation and before topping application (102). Pizza crusts may be chilled to help stabilize and prevent deterioration of the dough during the handling period that occurs after crust formation, and any par-baking, until the toppings are applied and the resulting food product is packaged and stored in a shelf-stable form (103). Chilled crusts may be cooled, refrigerated, or frozen. In general, the crust becomes stiffer, less flexible, and more resistant to being bent or folded out of plane the more intensely it is chilled. A powered conveyor refrigerator or blast freezer may used to reduce the temperature of the crusts as an in-line operation. For example, refrigerated crusts may exit the refrigerator at a temperature between approximately 0° C. to 4° C. Frozen crusts may exit a freezer at a temperature below 0° C.

Referring still to FIG. 1, process route A refers to direct feeding of individual unstacked crusts to an accumulating unit for accumulating (107) and transferring/dispensing them (108) individually at an approximately regular pitch onto another conveyor or transport device which transports crusts individually to a subsequent handling unit for pizza assembly (109). For instance, individual unstacked warm, cooled or frozen crusts may be fed directly to an accumulator assembly as the primary transport and handling system. Frozen crusts are generally too rigid for the fluffing operation or the particular manner of unstacking as exemplified herein, according to other embodiments of this invention where crusts are bent out of plane. Excess crusts (e.g., unfrozen crusts exceeding the throughput capacity of the downstream topping unit) can arise in production which are diverted from the direct transport line and stacked and stored until used in pizza assembly, as indicated by process routes A and C. In process route B, crust stacks have been allowed to cool before further processing. Adjacent warm crusts tend to stick together upon cooling. This creates a production problem if left unresolved. In an embodiment of the present invention, these cooled stacks are fluffed (105), unstacked (106), and accumulated/dispensed at regular pitch (107/108) for transport to a topping unit for pizza assembly. In another embodiment indicated by process route C, warm (uncooled) stacks of crusts can be introduced directly into an unstacker assembly for unstacking without needing a prior fluffing treatment, and then are accumulated/dispensed at regular pitch (107/108) for transport to a topping unit A warm stack of crusts that has not been allowed to pre-cool generally does not requiring pre-fluffing before unstacking, although that additional treatment is not excluded either.

Process scheme B for handling of crust stacks, which includes operations 105, 106 and 107, is described in greater detail in the following discussions. Since process routes A and C are lesser included variations of process B, the following descriptions applicable it provide details on them as well. As indicated in FIG. 1, once needed for pizza assembly, a stack of unfrozen cooled crusts, e.g., a stack of parbaked and cooled crusts, is initially mechanically fluffed (edge-separated) (105). The fluffed stack of crusts are mechanically unstacked to provide singulated crusts (106). The singulated crusts are mechanically accumulated (107) supplied from either the above described operation or fed directly from a singulated supply from (103), so that the crusts may be transferred individually in uniform pitch to a conveyor, which, in turn, feeds a topping unit (108). Topping materials are applied to the individual crusts (109), and then the assembled pizza may be packaged and stored in a shelf-stable form (110).

Figure 2:
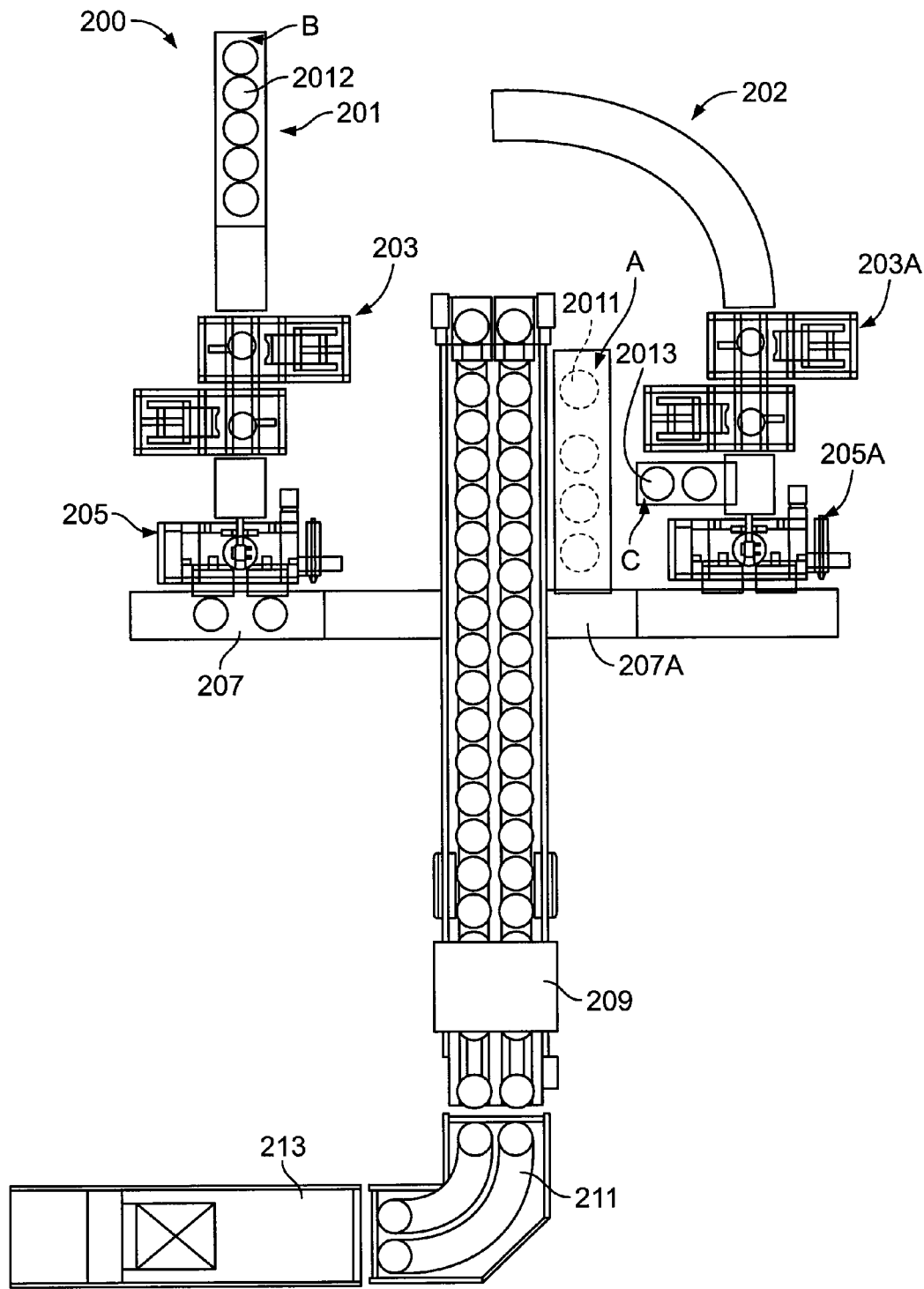
FIG. 2 is a plan view of a production floor layout for making ready-to-prepare pizzas including a system for handling pizza crusts in an automated manner according to embodiment of the invention.

Referring to FIG. 2, a particular system 200 for handling pizza crusts in accordance with an embodiment of the invention is illustrated including a pair of separate assembly lines 201 and 202 having similar crust processing units, although one or more such processing lines could be included in a layout depending on the on-site production capabilities desired. For purposes of this non-limiting illustration, above-mentioned process route B is indicated as being incorporated into assembly line 201, while process routes A and C are incorporated into process line 202. As will be appreciated, process routes A, B, and C all could be incorporated into either assembly line 201 or 202, or other variations could be practiced. Referring primarily to process line 201 for convenience, stacks 2012 of unfrozen pizza crusts are taken either directly from a bakery or manually from storage, and the individual crusts within each stack are initially fluffed (separated) at fluffing assembly 203 (similarly, 203A in process line 202). The fluffed stack is then transferred to a continuous unstacking assembly 205 (similarly, 205A in process line 202) that positions the crusts to be picked as a single crust from the stack using a unique servo-driven, rolling pin vacuum head picker according to an embodiment of the invention. The single crusts are placed on a lift pad at the unstacking assembly that transfers the crusts to an accumulator conveyor 207 (similarly, 207A in process line 202) feeding the singulated crusts to an accumulator assembly 209, which in turn delivers the crusts to the assembly line 211 on pitch for receiving a topping at a topping assembly 213. Additional details of the fluffing, unstacking and accumulating assemblies are described in greater detail hereinafter. As indicated for process line 202, individual crusts (unfrozen or frozen) 2011 of process route A may be fed directly onto a transport conveyor 207A for transport to the accumulating assembly 209 without need for prior fluffing at fluffing assembly 203A or unstacking at unstacking assembly 205A. As also indicated for process line 202, stacks 2013 of warm (uncooled) crusts of process route C may be fed directly to unstacking assembly 205A prior to transfer to transport conveyor 207A for transport to the accumulating assembly 209 without need for a prior fluffing operation at fluffing unit 203A.

Manual labor needs and associated costs and production delays are significantly reduced or essentially eliminated by the system's capability to fluff (separate), pick and place, and accumulate untopped pizza crusts to be placed in pitch on the assembly line for topping. "Pitch" refers to the gap in which each individual pizza crust is held or supported on a conveyor line. Preferably, the pizza crusts are staggered out uniformly on the conveyor line feeding the topping unit without gaps. Some embodiments reduce or eliminate the need for manual labor on the assembly line to make sure pizza crusts are on pitch.

Figure 3:
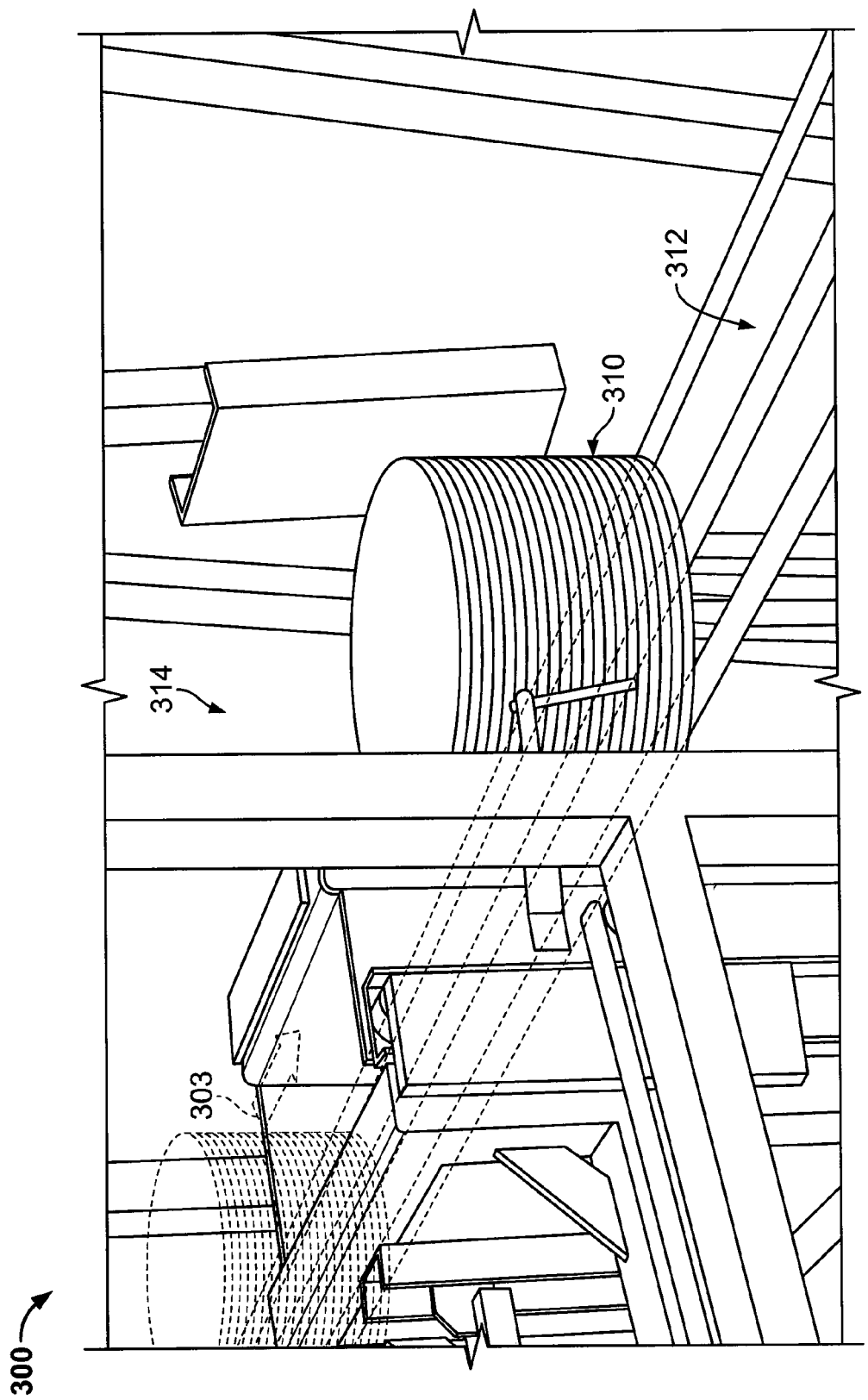
FIG. 3 is a perspective view of a crust stack fluffing assembly including a plurality of crust stack fluffer stations provided at staggered locations along the crust stack transport direction according to an embodiment of the invention.

Referring to FIG. 3, in one embodiment a stack of pizza crusts is initially fluffed in a fluffing assembly 300. Fluffing assembly 300 ensures physical separation of all sets of adjoining crusts of the stack that may have become stuck together after being stacked. In this illustration, a stack of crusts 310 is transported via a conveyor 312 in the direction indicated by arrow 303 to a fluffing station 314. The stack fluffing operation generally involves restraining the top-side and a lateral side of a crust stack while an opposite lateral side thereof is pushed out of plane sufficient that adjoining crusts can be physically separated from each other at their edge portions. The stack may be rotated 90 degrees and the process repeated. Once the stack is fluffed it may be advanced to another fluffing station to fluff the opposite side of the same stack, if necessary, before being advanced to the next significant processing unit which is used for unstacking. Although not limited thereto, the stack of crusts 310 may be received from a parbaking process after which individual parbaked crusts are stacked and forwarded on to the fluffing station 300.

Figure 4:
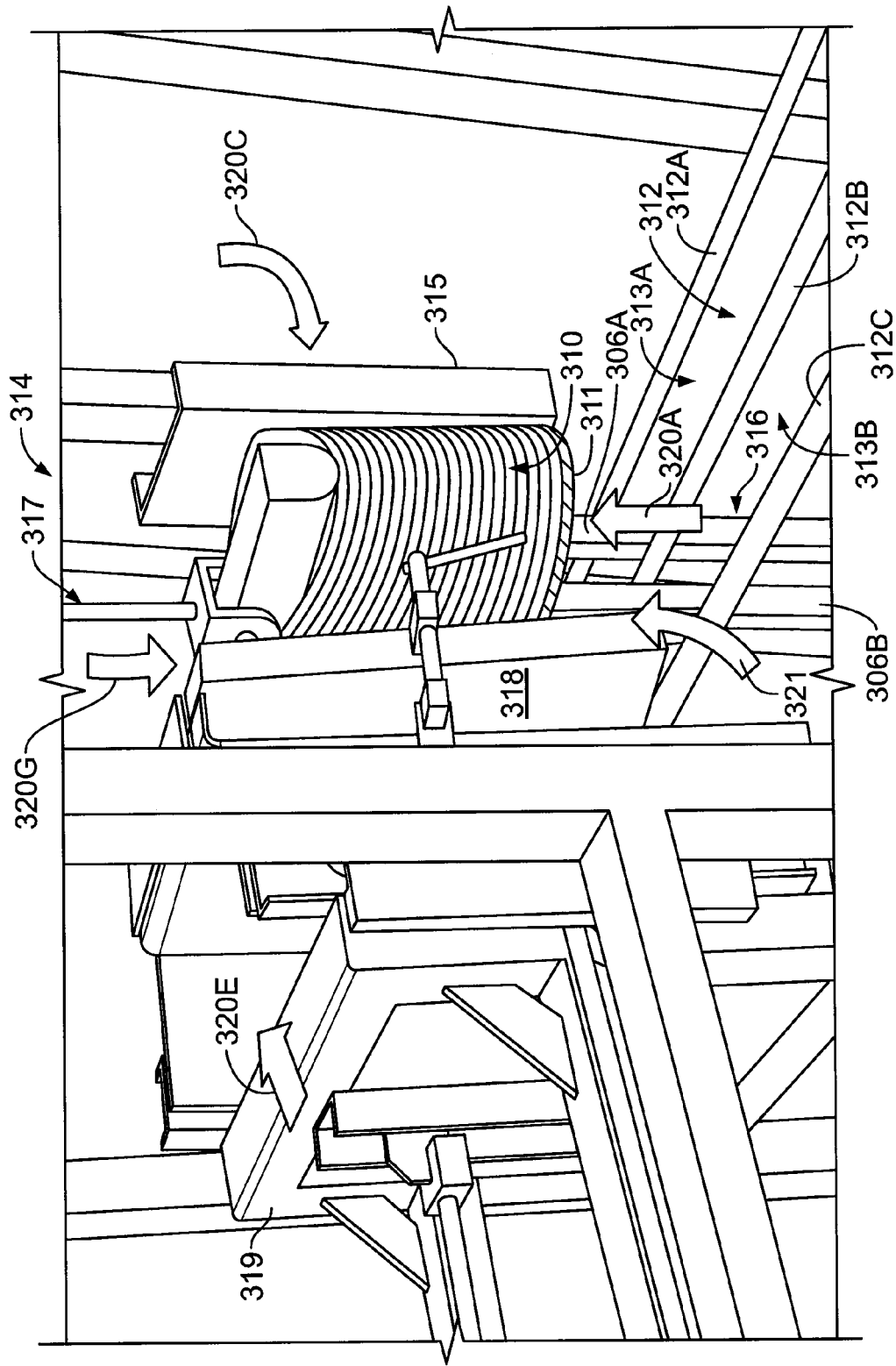
FIG. 4 is a perspective view of a fluff station fluffing a stack of crusts including indications of directions of movement of selected components immediately prior or during a stack fluffing treatment according to an embodiment of the invention.
Figure 5:
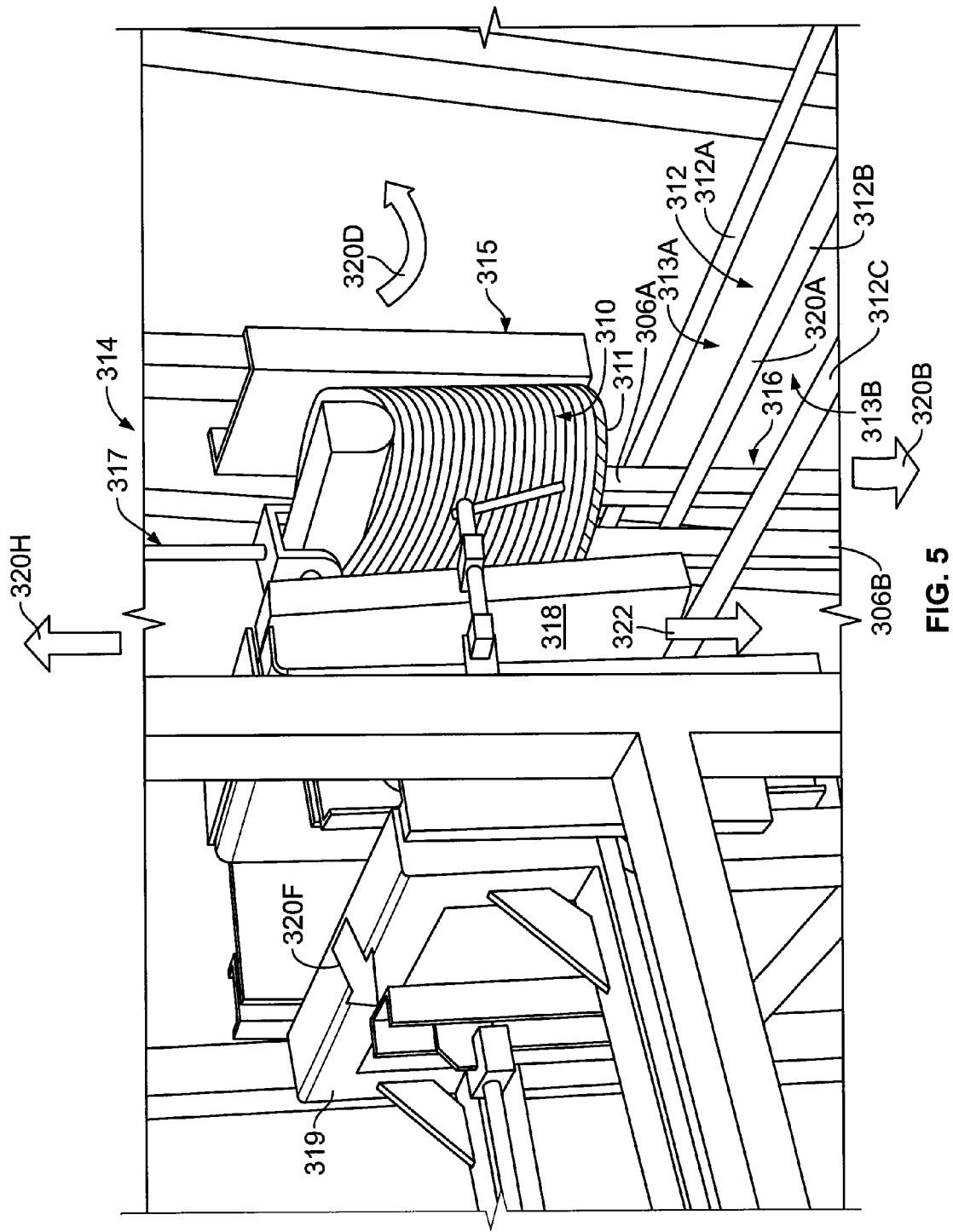
FIG. 5 is a perspective view of a fluff station fluffing a stack of crusts including indications of directions of movement of select components that will occur immediately after stack fluffing treatment according to an embodiment of the invention.
Figure 6:
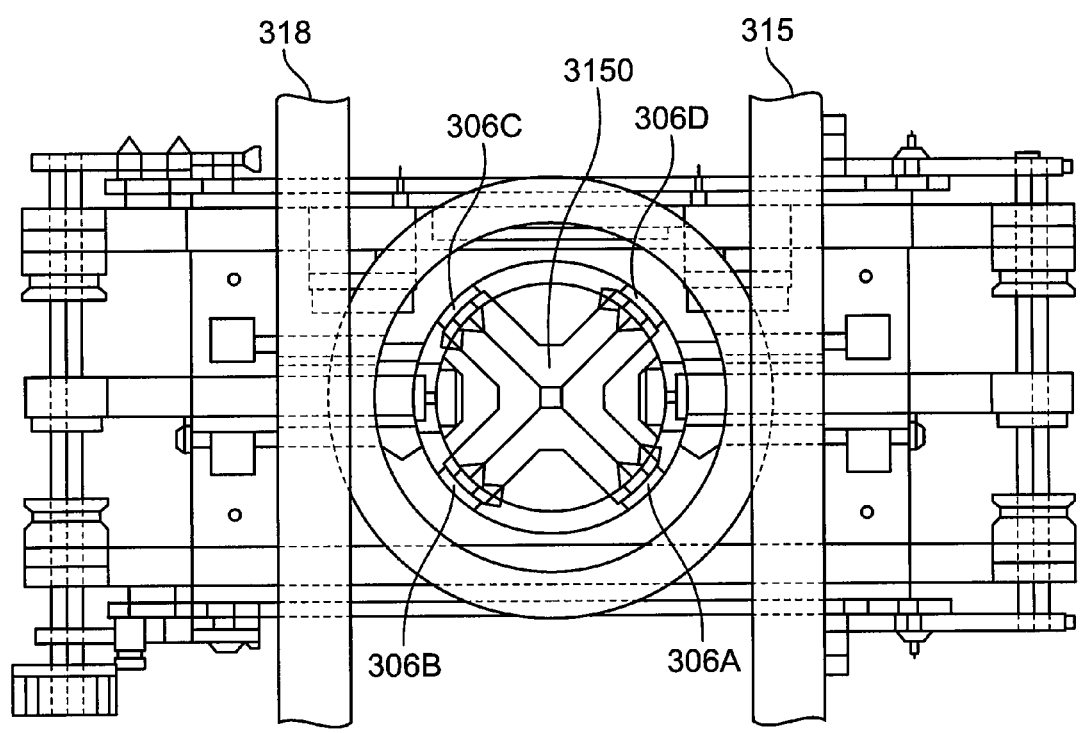
FIG. 6 is bottom plan view of a stack lifter component of the fluff station of FIG. 4.
Figure 7:
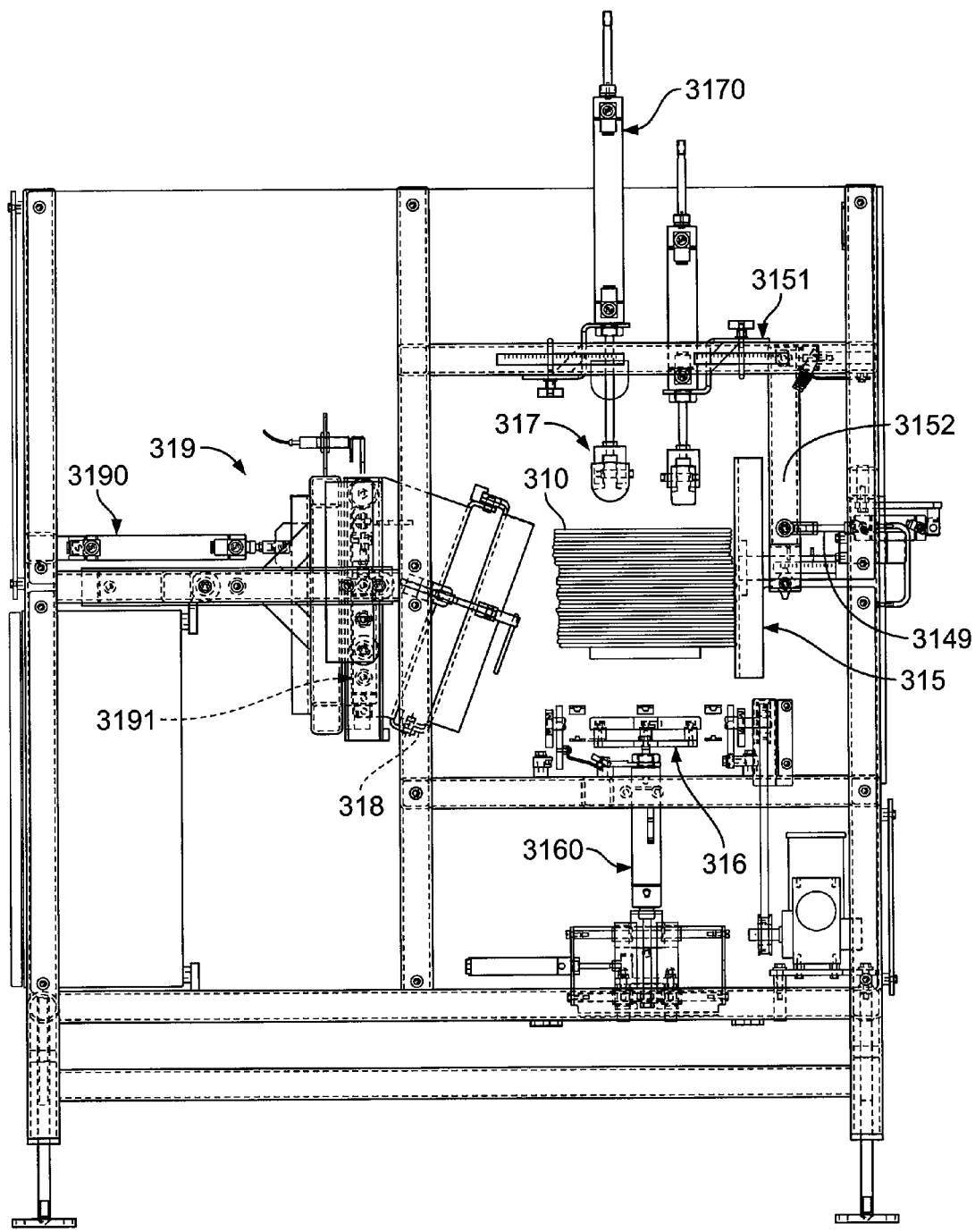
FIG. 7 is a front elevational view of the fluff station of FIG. 4.

Referring to FIGS. 4-5, the conveyor 312 is comprised of a plurality of parallel driven belts 312A-C defining intermediate air gaps 313A-B, which are configured to permit bottom support of a crust stack for transport to, through, and out of the fluffing station or unit 314. The stack 310 is raised and lowered vertically via retractable stack lifter 316. The retractable stack lifter 316 also includes a 90 degree rotation mechanism. Once the stack centered in the fluffer one side of the stack is fluffed. The stack is rotated 90 degrees and that side is fluffed. The stack is advanced to the second fluffer and the other two sides of the stack are fluffed; ultimately all four sides are fluffed. The lifter 316 comprises a stack support plate 311 connected at its lower side to a plurality of vertically reciprocal posts 306A-B, positioned in gaps 313A-B of the conveyor 312. The posts 306A-B (and two other posts 306C-D not visible in FIG. 4) are attached to a common bracket 3150 positioned below the conveyor belts 312A-C (see FIG. 6). The lifter 316 may have a pneumatic drive 3160 or be driven by some other suitable drive means (see FIG. 7). The lifter 316 may be controllably actuated to be moved upward as indicated by arrow 320A (FIG. 4), or downward as shown by arrow 320B (FIG. 5). During a fluffing cycle, the stack 310 is lifted a vertical distance via posts 306A-B sufficient that it clears the conveyor 312 and can be engaged on opposite lateral sides thereof by a lateral side holder member 315 and, on its diametrically opposite lateral side, by crust fluffing member 318. The diameter of plate 311 is sized to be less than that of the crusts comprising stack 310, such that when the stack is lowered back down to conveyor 312, that edge portions of the lowermost crust of the stack 310 contact drive belts of the conveyor. The conveyor 312 is de-activated while a fluffing operation is being performed on a lifted stack, and then re-activated when the fluffed stack is brought back down into contact with the conveyor after the crust stack has been fluffed. The diameter of plate 311 should not be sized so small as to permit the crusts to sag while supported on the lifted plate 311.

The lateral side holder member 315 is pivotally controlled such that it can be controllably swung into and out of contact with the side of the crust stack, as indicated by arrows 320C (FIG. 4) and 320D (FIG. 5) respectively. The pivotal movement of lateral side holder member 315 may be effected via pneumatic drive 3149 in conjunction with a linkage assembly including bracket 3151 and pivot arm 3152, which converts linear movement of the pneumatic drive 3149 to pivotal movement of lateral side holder member 315 (see FIG. 6). This is done to aid in removing the member for maintenance and sanitation purposes.

An upper hold down member 317 is mounted above the stack fluffing position at a location permitting it to be reciprocally lowered in the direction indicated by 320G into pinning contact with the top surface of the crust stack 310 (FIG. 4), and away from the stack in the direction indicated by arrow 320H (FIG. 5). The upper hold down member 317 may be driven by a pneumatic drive 3170 or by some other suitable drive means. The upper hold down member 317 contacts the surface of the top crust of the stack 310 at a location approximately midway between the center of the stack and the side edge opposite to the side being contacted by the fluffing member 318.

Figure 8:
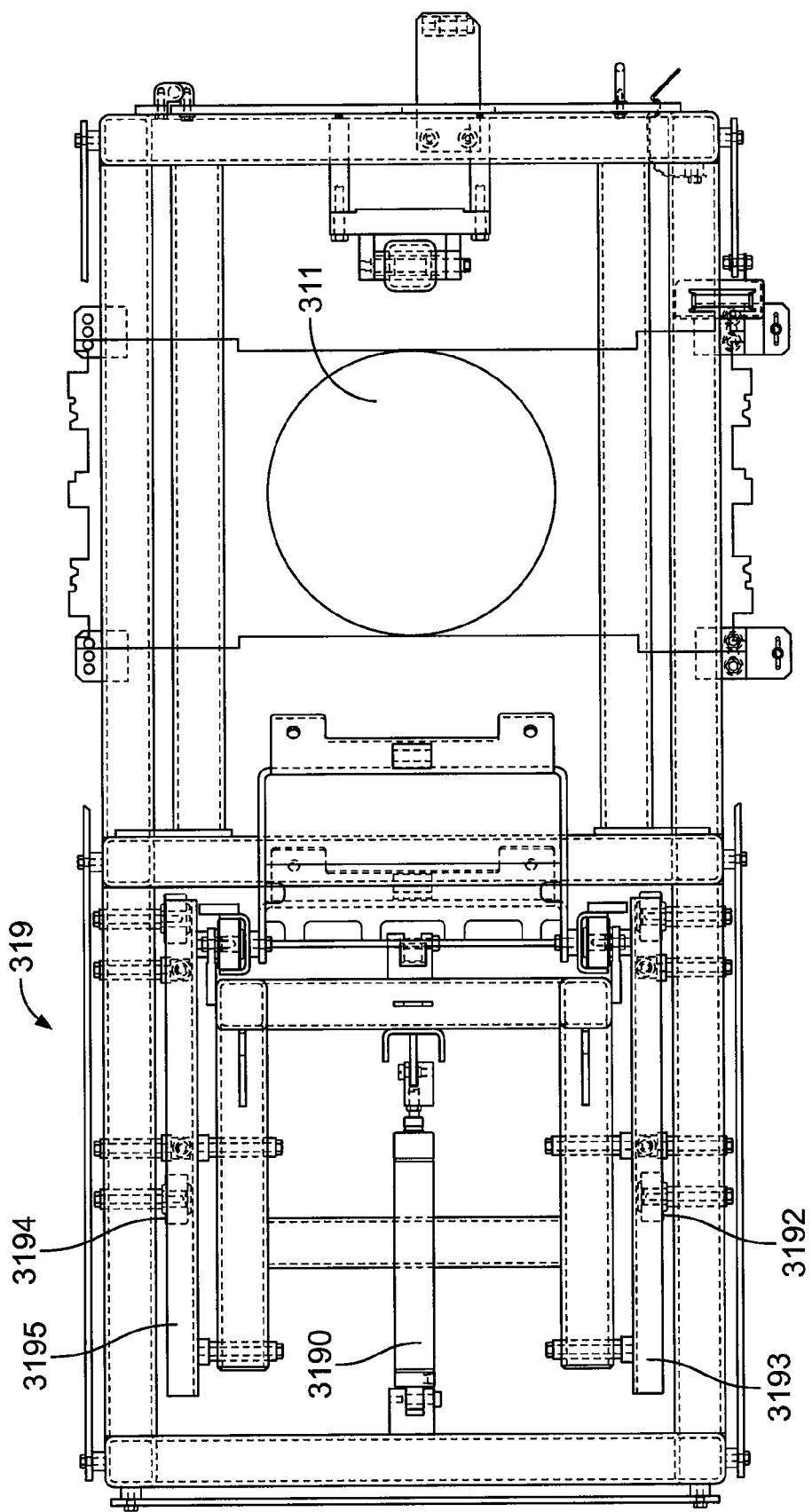
FIG. 8 is a partial plan view of the fluff station of FIG. 4.

The crust fluffing member 318 forms part of a stack fluffing module 328. Bidirectional movement of the fluffing member 318 is provided. The fluffing member 318 is mounted to a driven carriage 319 operable to reciprocally push the member 318 laterally towards the stack 310 in the direction indicated by arrow 320E (FIG. 4), and in the direction away from it as indicated by arrow 320F (FIG. 5). The lateral movement of the carriage, and hence the fluffing member 318, may be effected via pneumatic drive 3190 or some other suitable drive means (see FIG. 7). Vertical movement of the fluffing member 318, indicated by arrows 321 and 322, also is provided, such as by separate pneumatic drive 3191 (see FIG. 7). The carriage 319 is laterally movable upon actuation of the pneumatic drive 3190 via sets of rollers 3192, 3194 mounted at the lower side of the carriage 319 on respective horizontal tracks 3193, 3195 (see FIG. 8).

Figure 9:
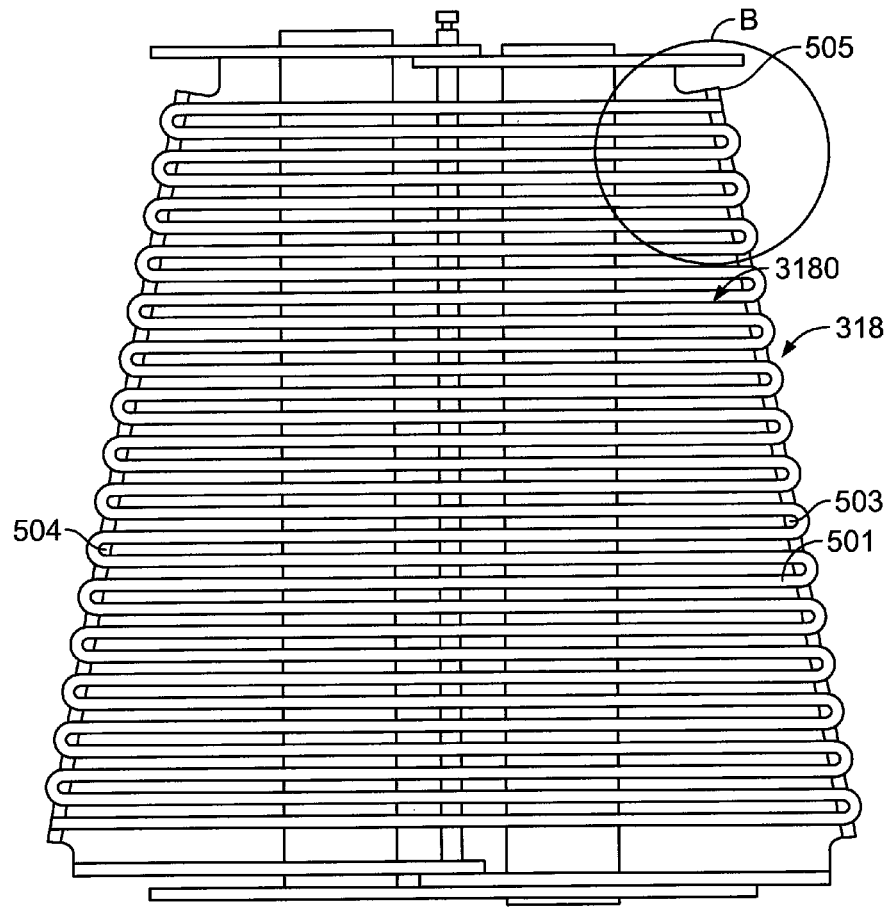
FIG. 9 is a front elevational view of a fluffing member of a fluff station shown in FIG. 4.

Referring to FIG. 9, the fluffing member 318 has a crust stack engaging surface 3180. The crust stack engaging surface 3180 preferably comprises a resilient surface which can both transmit bending force to a side of a crust stack sufficient to fluff crusts out of plane relative to adjoining crusts, while having sufficient resiliency so that it can flex so that crust edges are not damaged during fluffing. In this illustration, a resilient cord 501, such as a bungee cord or the like, is secured at one end to fluffing member 318 and strung back and forth by weaving around a plurality of fixed posts 503 and 504 provided on the opposite sides of an A-shaped frame member 505. The opposite end of the cord 501 is also attached to the A-frame 505. The A frame design provides greater cord tension at the top therefore bending the top crust out of the way of the bottom crusts in order to minimize the force require to properly fluff the bottom crusts of a stack. That is, the A-frame 505 bends the top crusts of the stack further back, allowing the next lower crust to be separated from the stack without the crust above it significantly impeding its bending motion.

Figure 10:
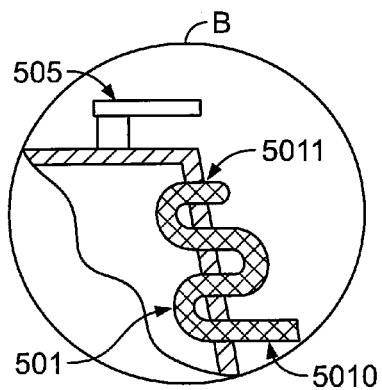
FIG. 10 is an enlarged elevational view of portion B showing a cord end connection portion of the fluffing member illustrated in of FIG. 9.
Figure 11:
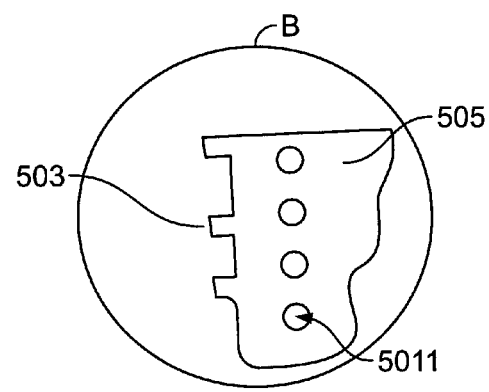
FIG. 11 is an enlarged side view of portion B showing stringing posts and cord end connection holes of the fluffing member illustrated in of FIG. 9.

FIGS. 10 and 11 illustrate that a cord or belt end 5010 of cord 501 may be secured to the frame 505 via frame holes 5011. The cord 501 can then be wrapped around posts 503 as it is strung back and forth across the transverse face of the frame 505. The resilient cord is evenly distributed from top to bottom over the side of the A-shaped frame member 505, forming the crust engaging surface 3180. In one non-limiting embodiment, an approximately 3/8 inch (9.5 mm) diameter bungee cord is woven onto the A-frame 505 as described above providing transverse bungee cord segments which are horizontally spaced apart approximately 3/8 inch to approximately 3/8 inch.

A flexible fabric (not shown) piece also may be tautly attached on the outer surface of the strung bungee cord to provide a continuous contact surface. The crust engaging surface 3180 also may be comprised of a resilient elastomeric material, foamed rubber, and the like, attached or overlain on the A-frame member 323, which is firm enough to grip and transmit bending forces to the crust edges, but locally yields sufficient to reduce damage to the crust edges.

FIGS. 12-15 show a sequence of stages of a fluffing operation for fluffing a stack of crusts 310 at fluffing station 314. The views are partially isolated to simplify the illustration.

Figure 12:
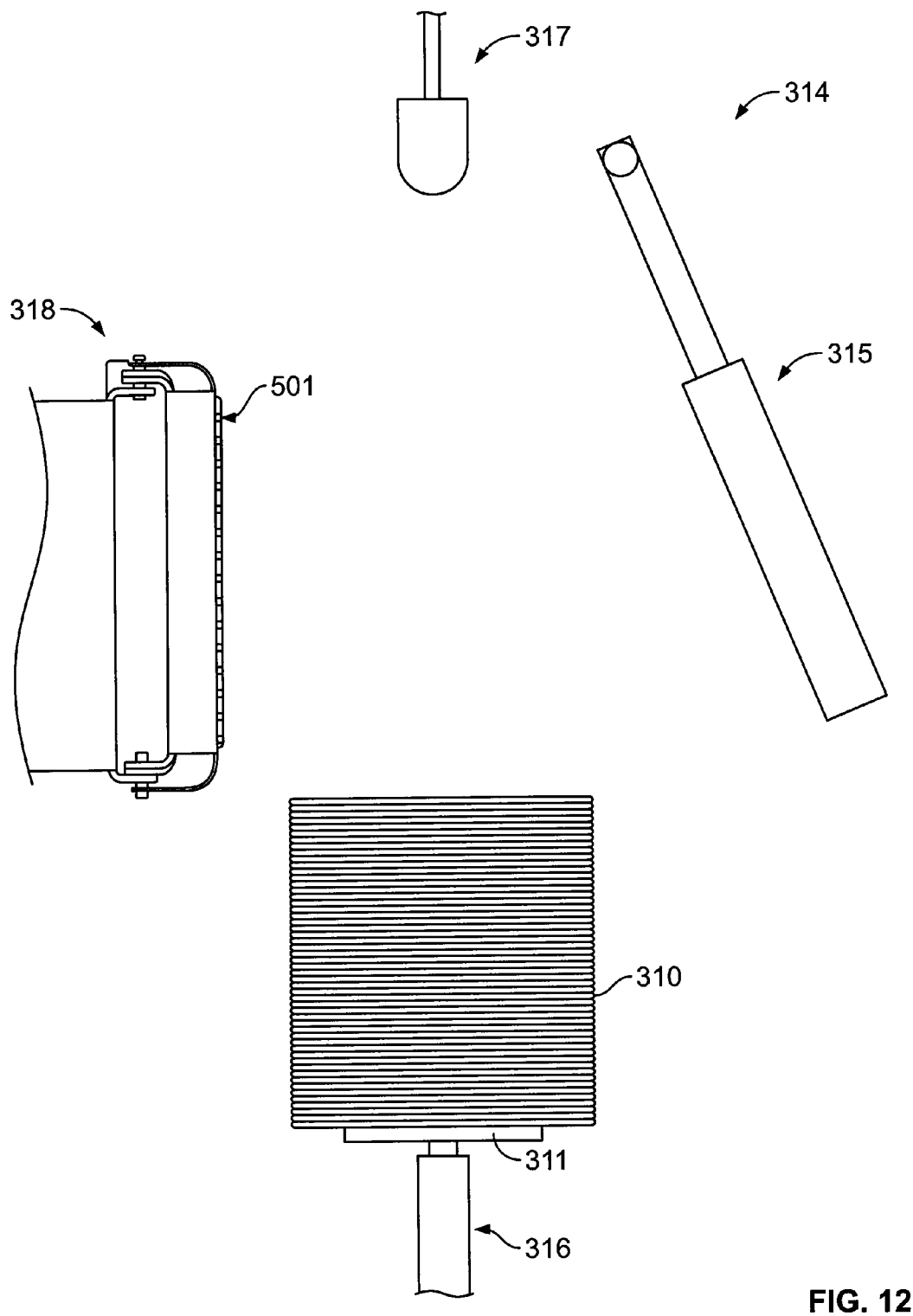
FIG. 12 is a partial isolated view of the fluff station shown in FIG. 3 taken along the crust stack transport direction where a crust stack has been advanced to a location beneath a fluff station.

Referring to FIG. 12, a stack 310 has been moved into position within a fluffing station 314. A sensor is used to detect the stack presence on the support plate 311 of the lifter 312 of the fluffing station 314, which information is inputted to an electronic controller (not shown) which automatically stops the forward progress of the conveyor 312 and centers the product (see FIGS. 3, 4).

Figure 13:
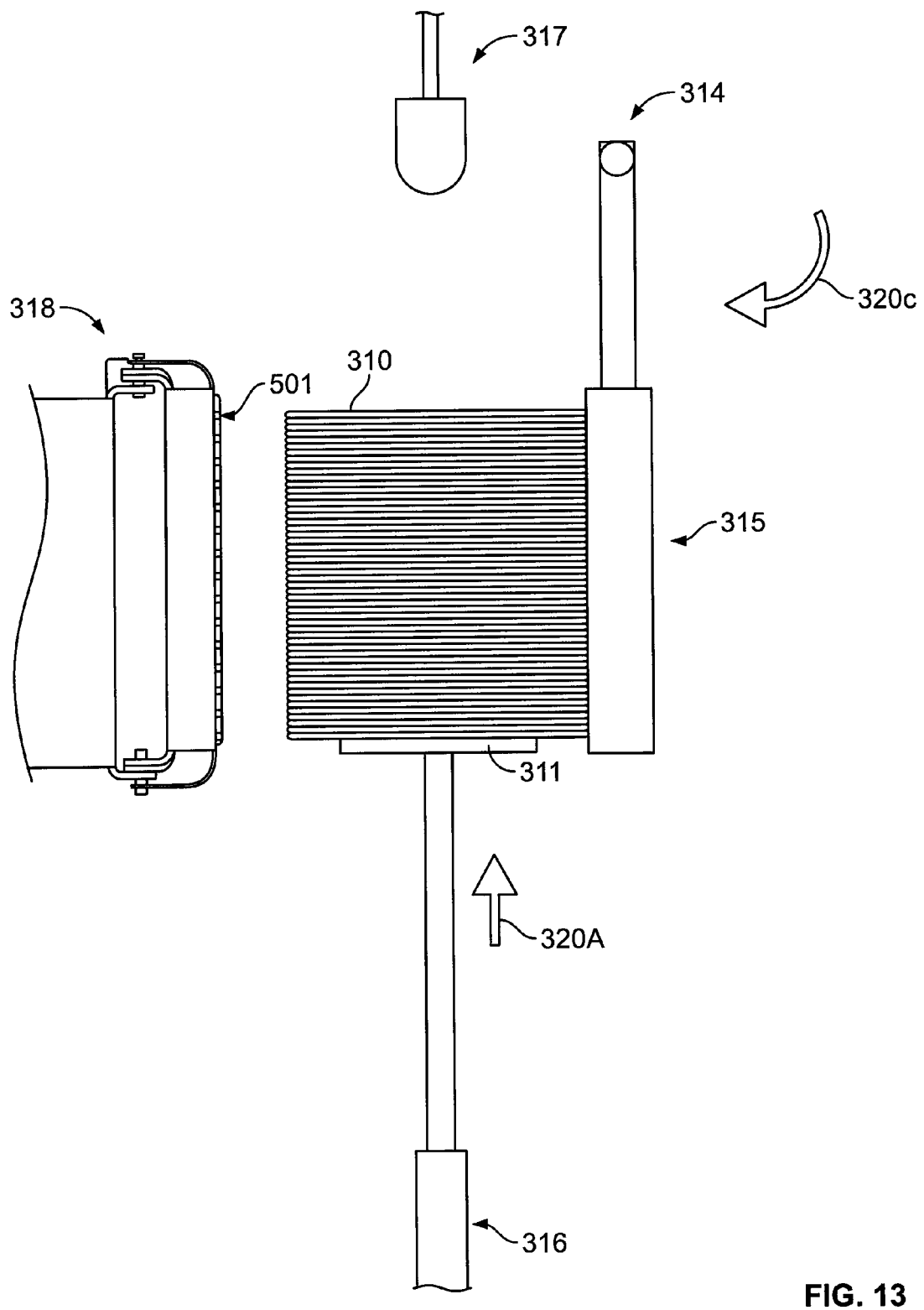
FIG. 13 is a partial isolated view of the fluff station shown in FIG. 3 taken along the crust stack transport direction where the crust stack has been loaded into the fluff station and engaged by a side support.

Referring to FIG. 13, lifter 316 is moved upward as indicated by arrow 320A sufficient to raise the stack 310 to a similar elevation as fluffing member 318. Concurrently, side holder member 315 is pivoted downward as indicated by arrow 320E until it contacts a side of the stack 310.

Figure 14:
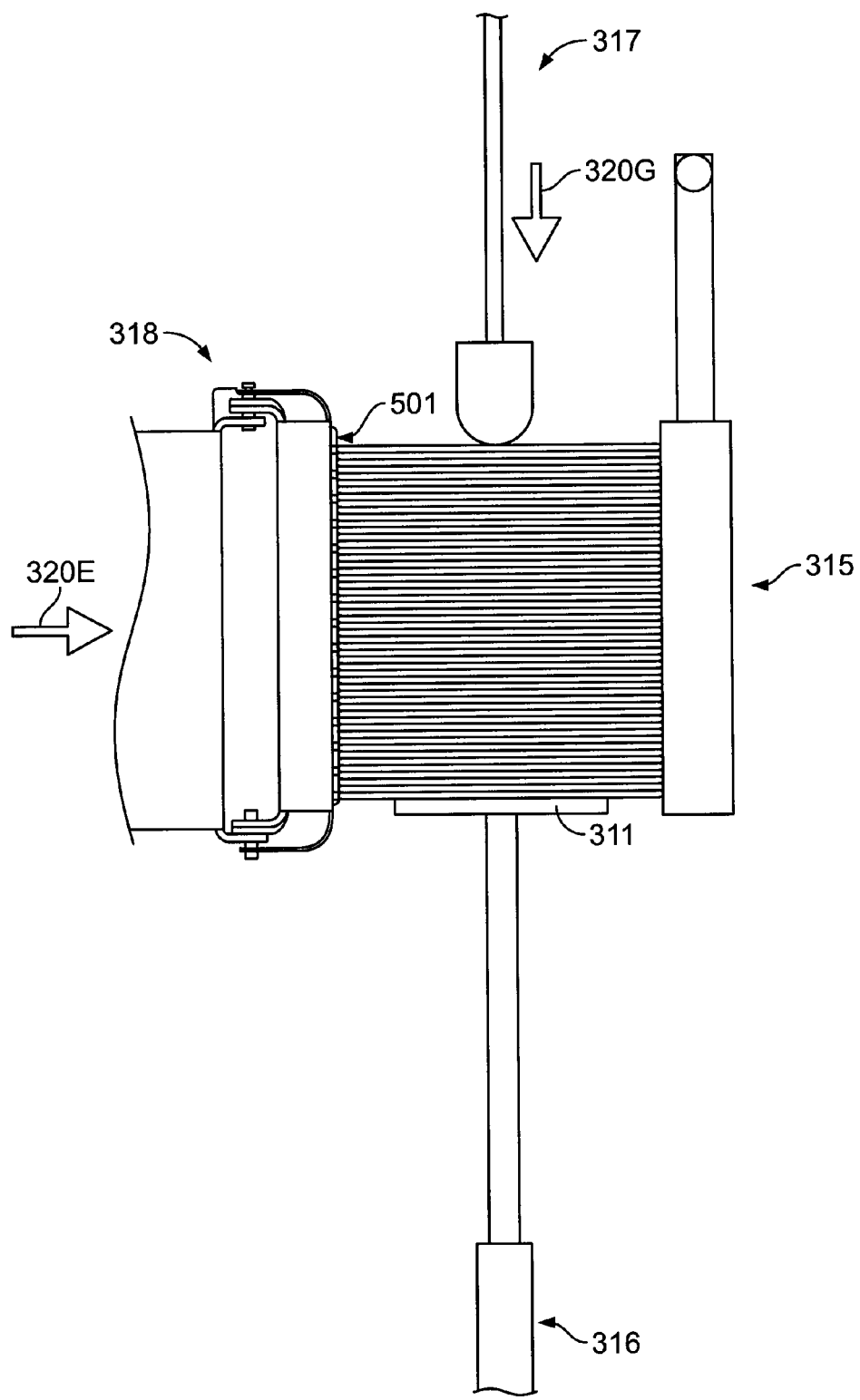
FIG. 14 is a partial isolated view of the fluff station shown in FIG. 3 taken along the crust stack transport direction where the a crust stack is engaged from above by a holding pin and from the side opposite the side support by a fluff member.

Referring to FIG. 14, fluffing member 318 is laterally projected in the direction 320E until its engagement surface 501 contacts the side of the stack 310 opposite to side holder member 315. Concurrently, hold down member 317 is extended downward as indicated by arrow 320G until making pinning contact with the top of the crust stack 310. It will be appreciated that the mechanical movements performed in FIGS. 12 and 13 may be performed in an opposite sequence to the above illustration or simultaneously.

Figure 15:
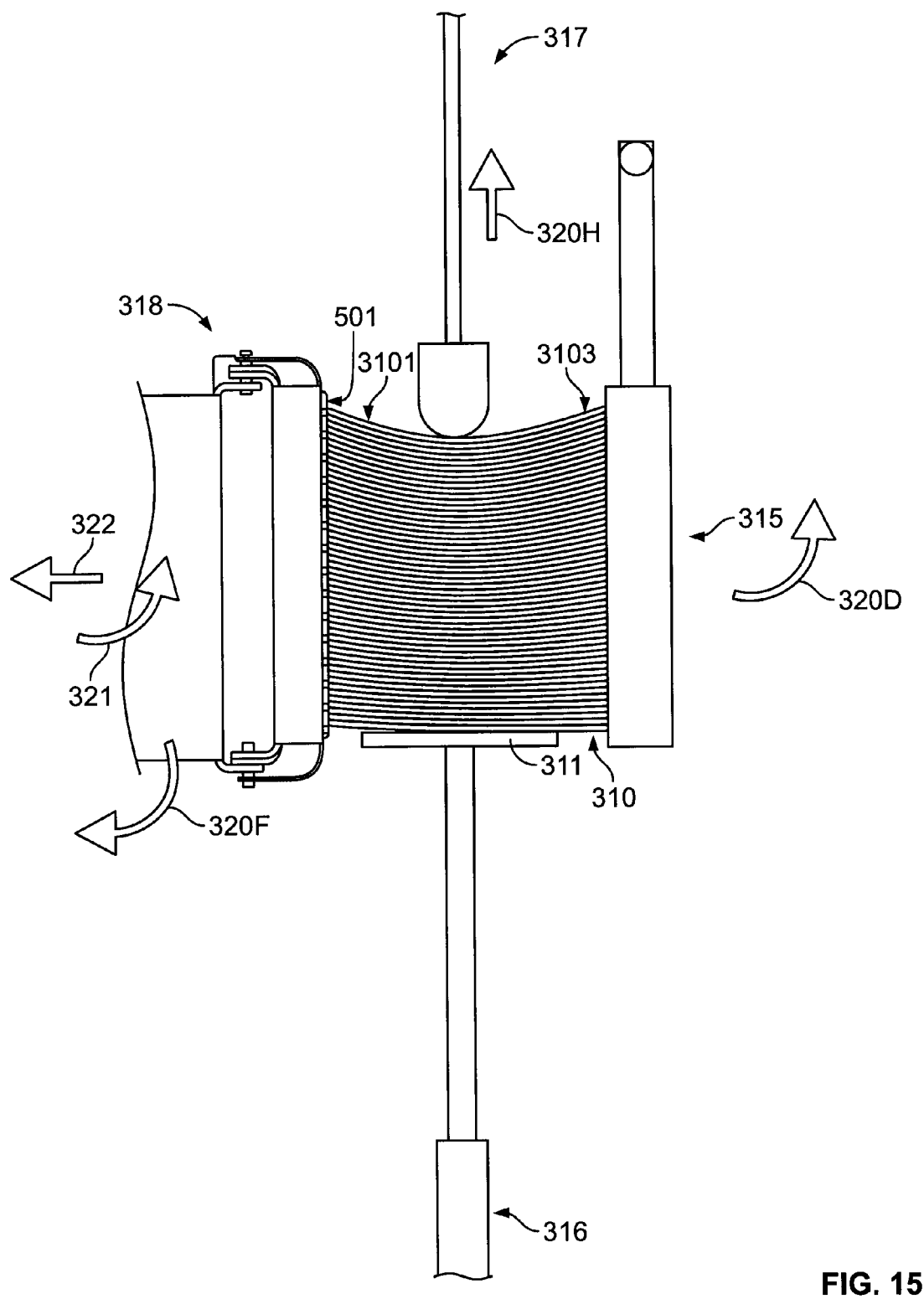
FIG. 15 is partial isolated view of the fluff station shown in FIG. 3 taken along the crust stack transport direction where the crust stack is fluffed.

Referring to FIG. 15, fluffing member 318 is moved vertically as indicated by direction 321 while hold down member 317 pins the top of the crust stack 310 supported on plate 311, and side holder member 315 pins the opposite lateral side. The resulting upward pushing action made against one side 3101 of the stack of crusts relative to the opposite lateral side 3103, which essentially remains at rest, is effective to detach any adjoining edge portions of the crusts along side 3101. To complete the fluffing cycle, upper holder 315 can be withdrawn in direction 320D, hold down member 317 can be withdrawn in direction 320H, fluffing member 318 can be withdrawn in direction 320F and lowered back to its starting elevation along direction 322, and lifter 316 is lowered until the stack 310 renews contact with the conveyor 312 (see FIG. 12).

Preferably, a crust stack is fluffed from opposite sides thereof to further ensure adjoining crusts of a given stack are not stuck or otherwise associated together. This may be done at a single fluffing station or a plurality of them staggered along the conveyor 312 at the fluffing assembly 300. In one embodiment the stack 310 is conveyed via conveyor 312 to second downstream fluffing station (not shown in FIG. 3), after treatment at fluffing station 314. The second fluffing station comprises a similar yet mirror image equipment arrangement of station 314, such that the opposite lateral side of the stack 310 can receive a similar fluffing treatment before the stack leaves the fluffing assembly 300. In another alternative, one fluffing member 318 may be used to fluff both sides of a crust stack, by providing for the rotation of the stack relative to the engagement surface 501 of fluffing member 318 between several fluffing cycles. To accomplish this result, the crust stack may be rotated in any convenient manner such as by resting the stack on a rotatable turntable portion (not shown) supported upon plate 311 of lifter 316, which has automated or manually controllable degrees of rotary motion. For instance, the stack is fluffed from one lateral side by a fluffing member 318, then the stack is rotated approximately 90°, and the fluffing member is distended again to fluff the opposite lateral side of the same stack. In another alternative, a second fluffing member, identical to fluffing member 318, is provided in lieu of side holder member 315, such that the pair of fluffing members can be used in a coordinated manner such that one member fluffs while the other provides a static side support to the opposite side of the same stack. After one side of the stack is fluffed, the fluffing members can be re-deployed such that the fluffing member that originally fluffed now provides side support for the fluffed side of the stack while the opposite fluffing member fluffs the opposite side of the stack that was originally merely supported from the side.

Figure 16:
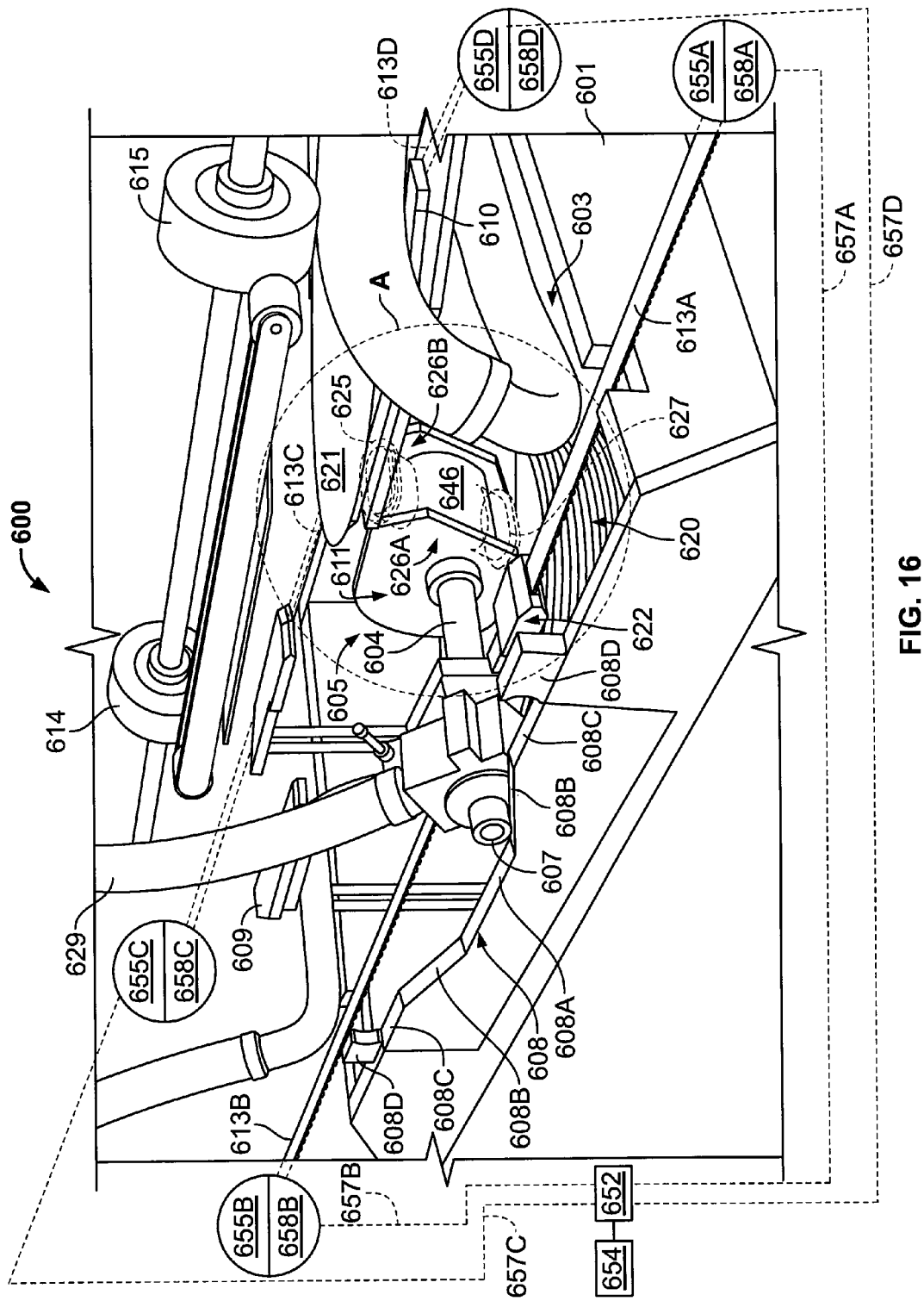
FIG. 16 is a perspective view of a crust unstacker assembly according to an embodiment of the invention picking and releasing singulated crusts at opposite sides of a picker.

Referring to FIG. 16, an unstacker assembly 600 is shown which is used to singulate individual crusts from the fluffed stacks of crusts provided by fluffing assembly 300. In general, the unstacker assembly 600 includes a generally rectangular shaped frame 601 which defines and borders a central opening 603 leading to/from a space below from which stacked crusts are fed to and below the unstacker from the fluffing assembly via a conveyor, which aspect is described below in more detail with reference to FIGS. 17-18.

Referring generally to FIG. 16, a picking mechanism 605 spans opening 603 and has opposite end rollers 607 adapted to travel back-and-forth on laterally-extending ramps 608 provided on the front and rear sides, respectively, of frame 601. The rear side ramp is not visible in this view, but it is identical to the displayed ramp 608 on the front side. Ramps 608 run between lift platforms 609 and 610 arranged at opposite lateral sides of the frame 601. Picking mechanism 605 includes a pick head 611 rotatably mounted on a rotary shaft 604. It has respective rollers 607 arranged on opposite ends of the rotary shaft 604. The rollers 607 are adapted to travel on ramps 608. The picking mechanism 605 is reciprocally movable back-and-forth between lift platforms 609 and 610 via a pair of drive belts 613A, 613B and 613C, 613D connected to the picking mechanism 605 at each side of the pick head 611. These drive belts may be releasably connected to picking mechanism 605 at attachment points such as indicated by connection 622. The ramps 608 include lower horizontal portion 608A where the pick head 611 is effectively lowered down into contact with the top of the stack, flanked by opposite inclined side portions 608B which end on upraised flats 608C having back stops 608D. The raised portions of ramp 608 help pick head 611 and a picked crust clear the frame 601 as the pick head 611 is brought into sufficiently closer elevational proximity with the lift platforms 609 and 610 to allow a picked crust to be transferred thereon.

The centrally located pick head 611 of picking mechanism 605 laterally moves, via the rotary shaft 604, in conjunction with motion imparted to respective end rollers 607 that travel on respective guide ramps 608 at the front and rear sides of the frame 601. The pick head 611 is operable to grip, peel, transport, and release/transfer successive individual products from the stack to the lift platforms 609 and 610. The pick head 611 includes a pair of side wheels 626A-B and a medial portion 646 to which suction devices 625 and 627 are associated. These features may be better seen in FIG. 19. The wheels 626A-B, and similarly medial portion 646, are fixed for rotation with shaft 604. The wheels 626A-B generally are rounded, and may be circular or a combination of rounded and polygonal sides along its circumference. The wheels 626A-B preferably have a circumference larger than the diameter of the crust or other food product being picked up effective to enhance peeling action on the top crust relative to the remaining stack of crusts. At least one suction device is used. Suction devices 625 and 627 are operable for releasably applying suction to an edge portion of a food product resting on top of the stack of food products. Pick head 611 is controllably moved across a top surface of a crust stack 620 loaded up through opening 603 such that individual crusts 621 may be successively releasably gripped by the pick head 611, when then are peeled from the stack while the pick head is rolled across the top surface of the stack and is laterally transported to one or the other lift platforms 609 or 610 for transfer thereon. FIG. 16 shows a picked crust 621 that has been transferred to lift platform 610. The lift platforms 609 or 610 are operable to move downwards to receive a crust transferred from the pick head 611, and thereafter lift the crust into contact with a transfer device 614 (or 615), e.g., an overhead roller, which transfers the crust to another conveyor which feeds downstream handling and process units. Additional details and features of the unstacker assembly 600 and its stack loading mechanism are described in more detail below.

Figure 17:
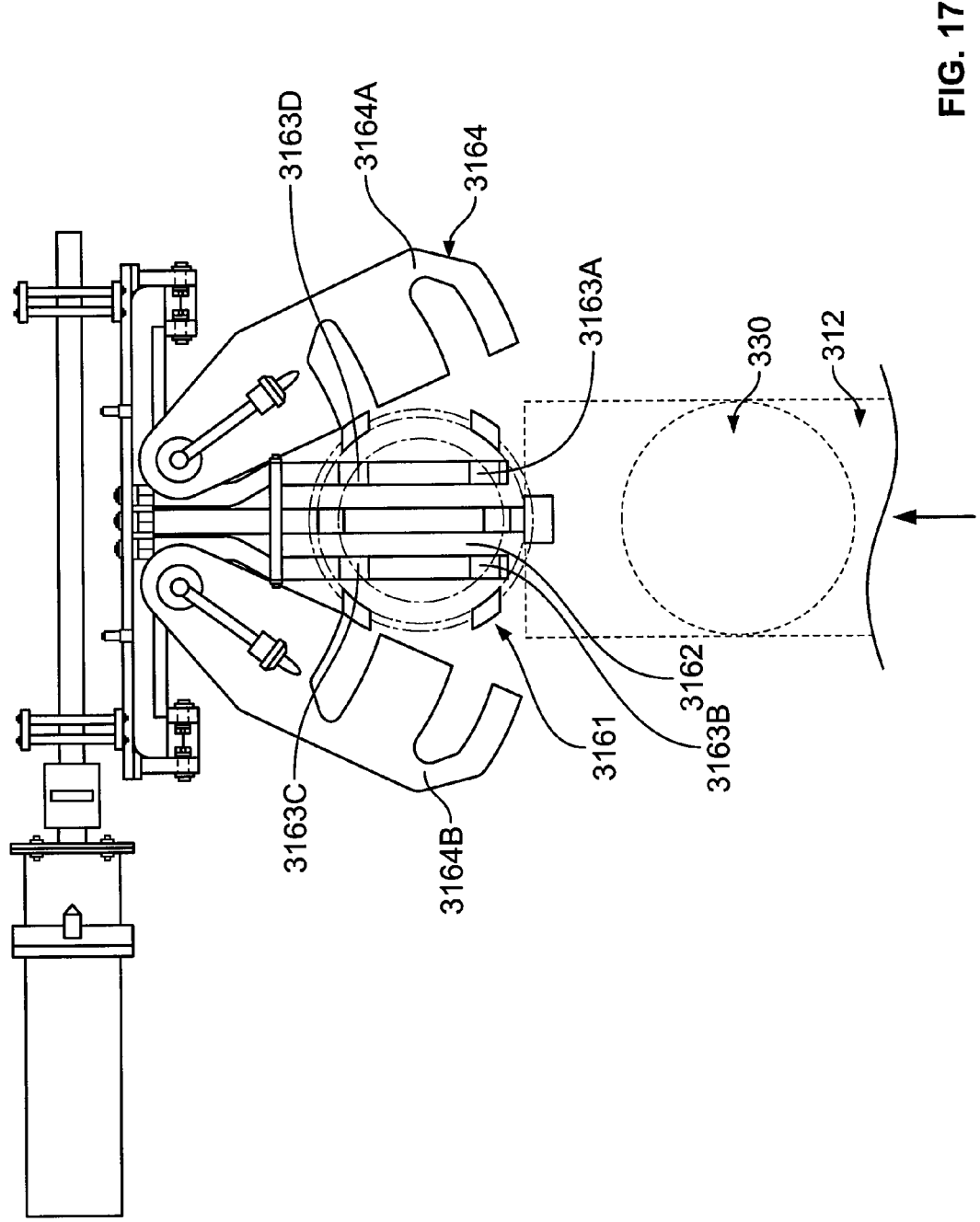
FIG. 17 is a plan view showing a bottom loader used to introduce fluffed stacks into unstacker assembly of FIG. 16.
Figure 18:
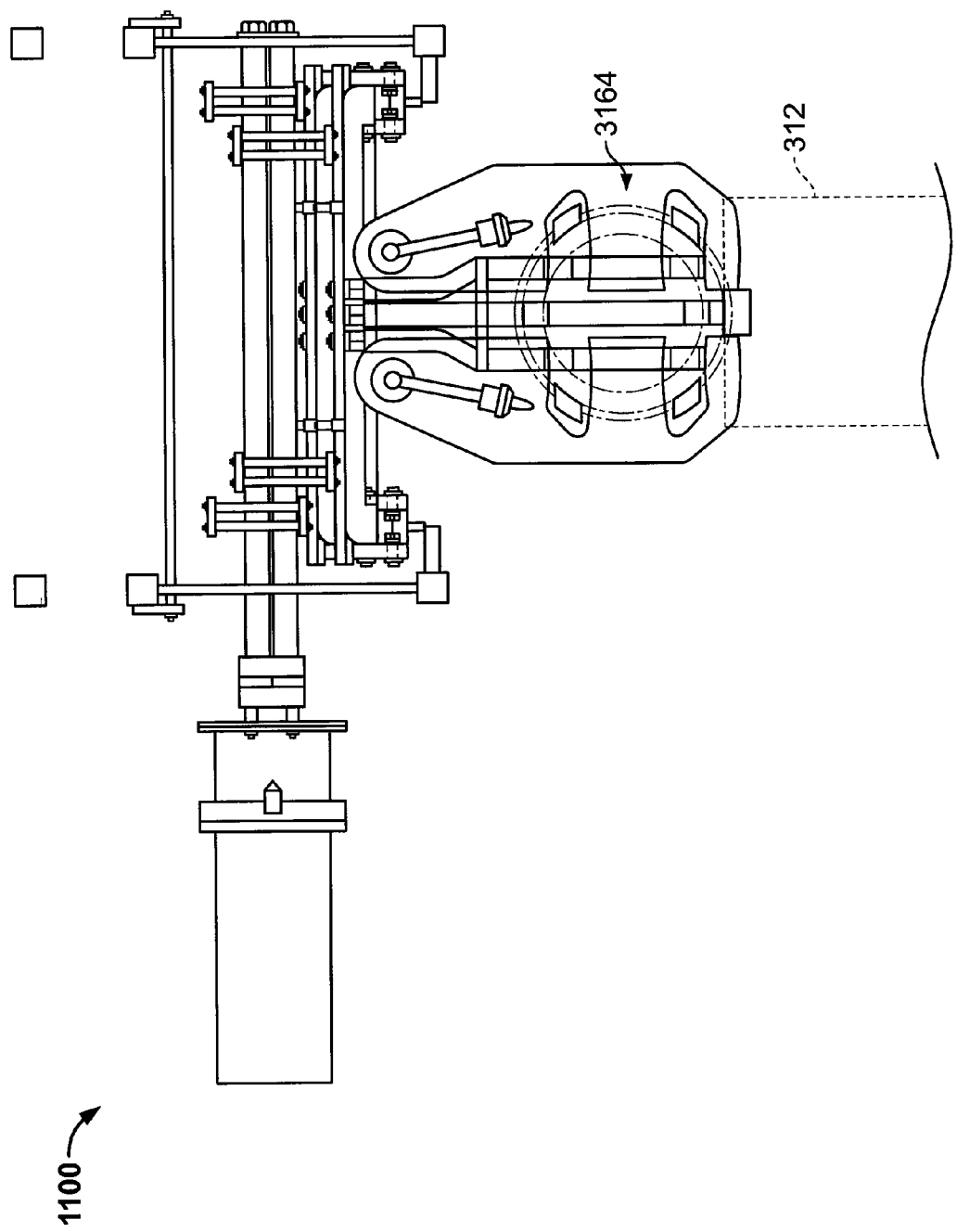
FIG. 18 shows the bottom loader of FIG. 17 in a different operational configuration during stack introduction.

Referring to FIGS. 17-18, additional details of the stack loading mechanism and operation used with unstacker assembly 600 are described. In the space below the unstacker assembly referenced above in connection with FIG. 16, a stack loader assembly 1100 is installed which sequentially receives fluffed stacks 330 transported on conveyor 312 from the discharge end of the fluffing assembly 300. The loader assembly 1100 is operable to lift the stack of food products a predetermined distance in a synchronized manner such that after the pick head picks a food product from a stack, the loader assembly is operable to upraise the stack a predetermined distance effective that the next pass of the pick head contacts the upper surface of the next successive food product in the stack. The stack loader assembly 1100 includes a lifter 3161 and lifter arm assembly 3164. Lifter 3161 comprises a bracket plate 3162 supporting four posts 3163A-D which are operable to be extended up through gaps in the driven belt segments comprising overlying conveyor belt 312, similar to the arrangement of lifter 316, although the posts here have free upper ends for directly contacting overlying stacks, instead being joined to a common plate member. Lifter arm assembly 3164 includes a pair of laterally pivotal support arms 3164A-B.

As shown in FIG. 17, a fluffed stack 330 is initially transported by conveyor 312 into a position directly above lifter 3161, while arms 3164A-B are flexed outward. A sensor, not shown, can be used to detect the presence of a stack upon lifter 3161 and stop forward progress thereof. The posts 3163A-D are extended upward, such as via pneumatic drive means (not shown) while arms 3164A-B held in the outward swung positions as indicated until the top surface of the stack comes into contact with the pick head component 603 of the unstacker 600 (e.g., see FIG. 19). As individual crusts are individually picked off the stack in a manner described in more detail below, the lifter 3161 is operable to progressively vertically raise the stack through predetermined increments of distance which keep up with the crust pick-off rate occurring above.

Referring to FIG. 18, before the current stack is completely exhausted at the picker, arms 3164A-B are swung inward in unison to a position in contact with the bottom of the current stack. The arms 3164A-B are operable to progressively vertically raise the stack through predetermined increments of distance which keep up with the crust pick-off rate occurring above. At this point, the posts 3163A-D of lifter 3161 can be retracted downward below conveyor 312 and held in that position until the next succeeding fluffed stack is conveyed over them. While the lifter arm assembly 3164 continues to feed the preceding stack into the unstacker from below, the posts of 3163A-D of lifter 3161 can be extended upward again sufficient to move the next stack upward. After the next stack is pushed upward until it reaches the lower surfaces of arms 3164A-B of the lifter arm assembly 3164, they are pivoted outward in a controlled manner so that the top surface of the new stack can be pushed into direct flush contact with the bottom of the preceding stack by action of posts of 3163A-D of lifter 3161. These operations with respect to a stack loader assembly 1100 can be repeated to maintain a continuous and ample feed of crusts in stacked form to the unstacker assembly 600.

Figure 19:
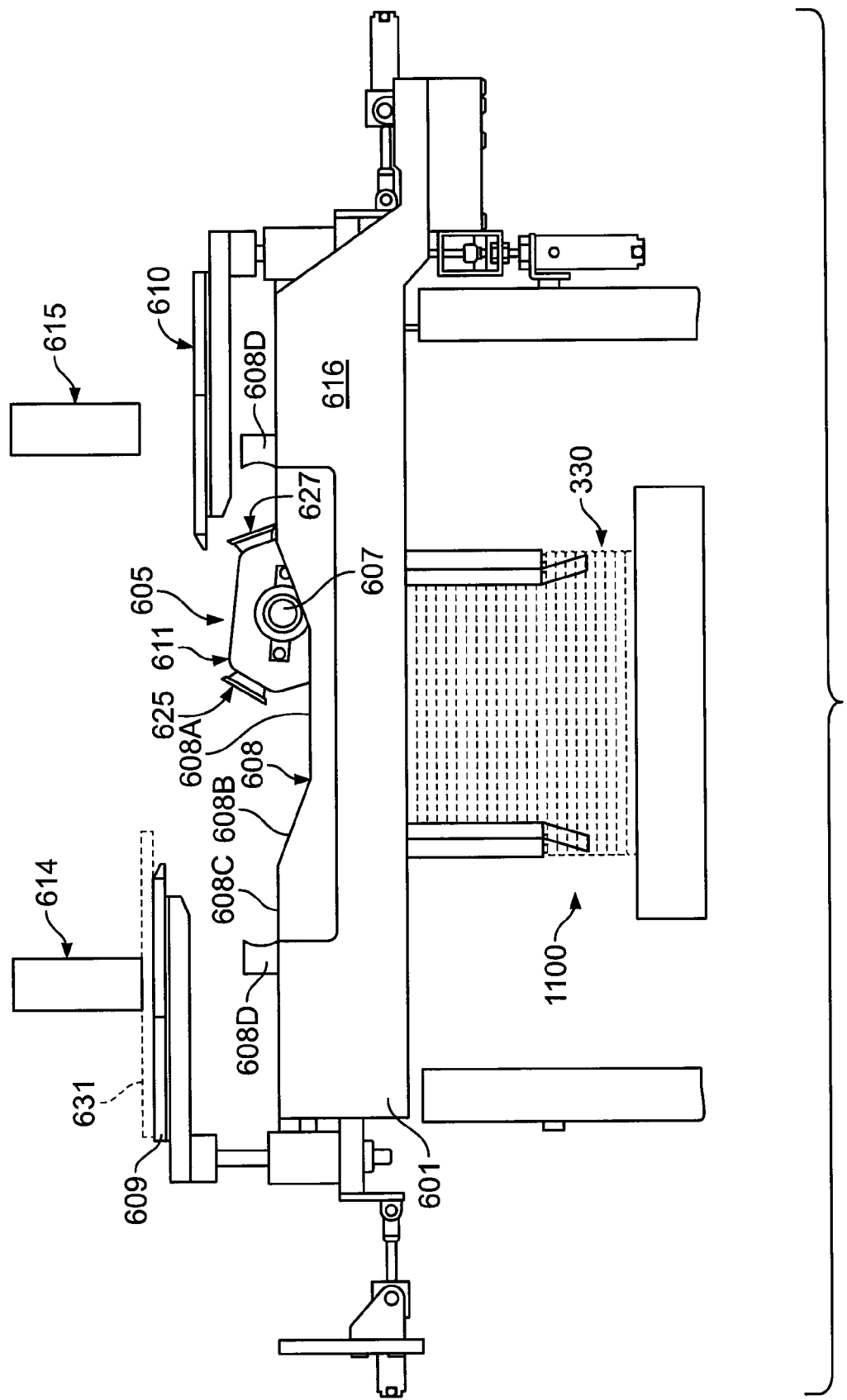
FIG. 19 is a front elevational view of the crust unstacker assembly of FIG. 16.

FIG. 19 shows the unstacker assembly 600 from the front view perspective. The rear side of the frame 601, which is not visible in this view, includes a ramp having a track surface identical to ramp 608 provided on the front side 616 of the frame 601. The picker mechanism 605 travels back-and-forth between side lifting platforms 609 and 610 on ramps 608 provided on the front and rear sides of frame 601, which travel is delimited by hard stops 608D provided at the respective lateral ends of the ramps 608.

Figure 20:
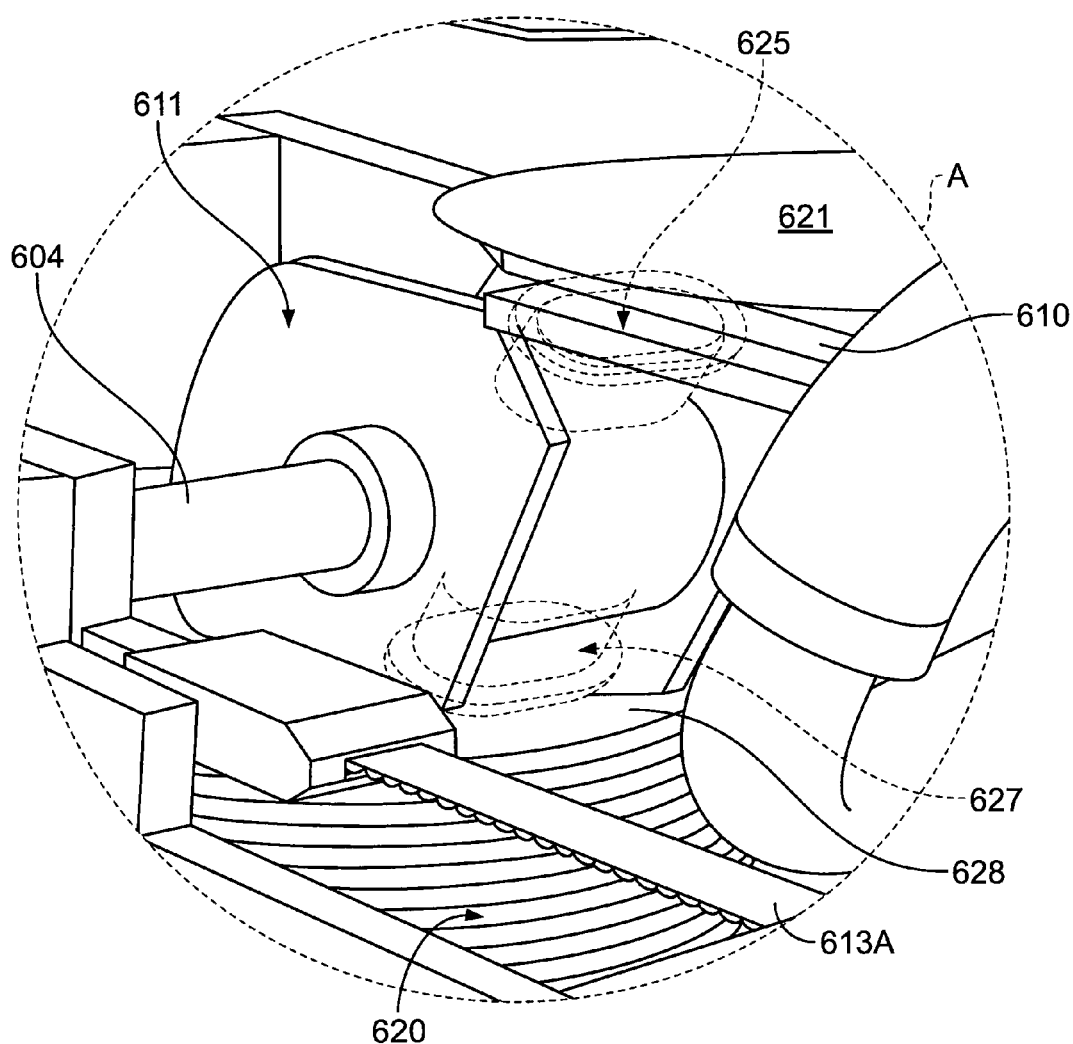
FIG. 20 is an enlarged view of portion A showing a picker subassembly illustrated in of FIG. 16.

Referring to FIG. 20, pick head 611 includes a pair of suction grippers 625 and 627 operable for releasably applying suction force to an edge portion of a crust 628 or other food product resting on top the stack 620 of food products. Vacuum line 629 (FIG. 16) fluidly communicates with suction grippers 627 and 629 via internal air-tight conduits (not shown) provided within shaft 604 and pick head 611.

Figure 21:
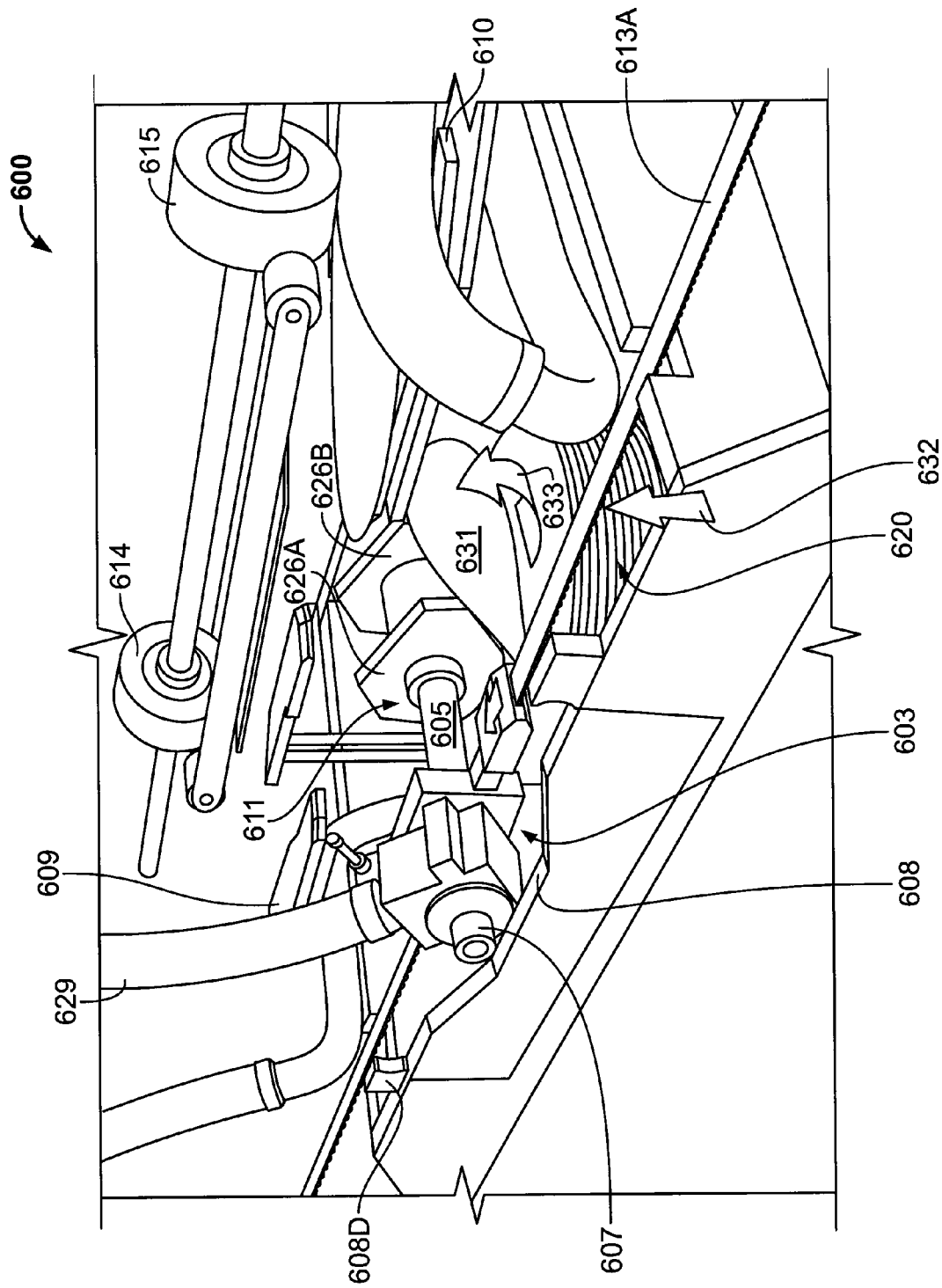
FIG. 21 is a perspective view of the crust unstacker assembly of FIG. 16 peeling a singulated crust from the top of the crust stack.
Figure 22:
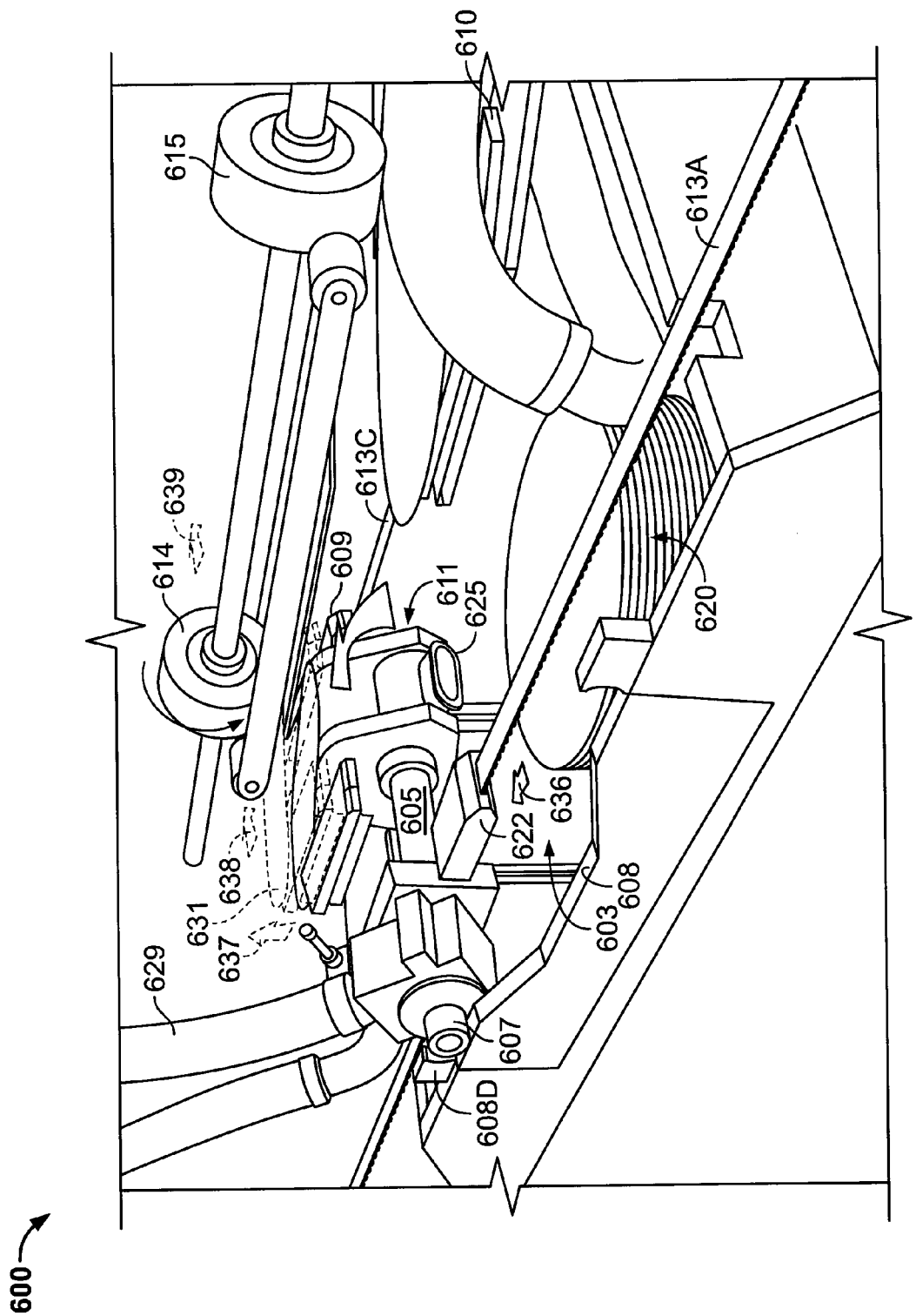
FIG. 22 is a perspective view of the crust unstacker assembly of FIG. 16 transferring a peeled crust onto a lifter.
Figure 23:
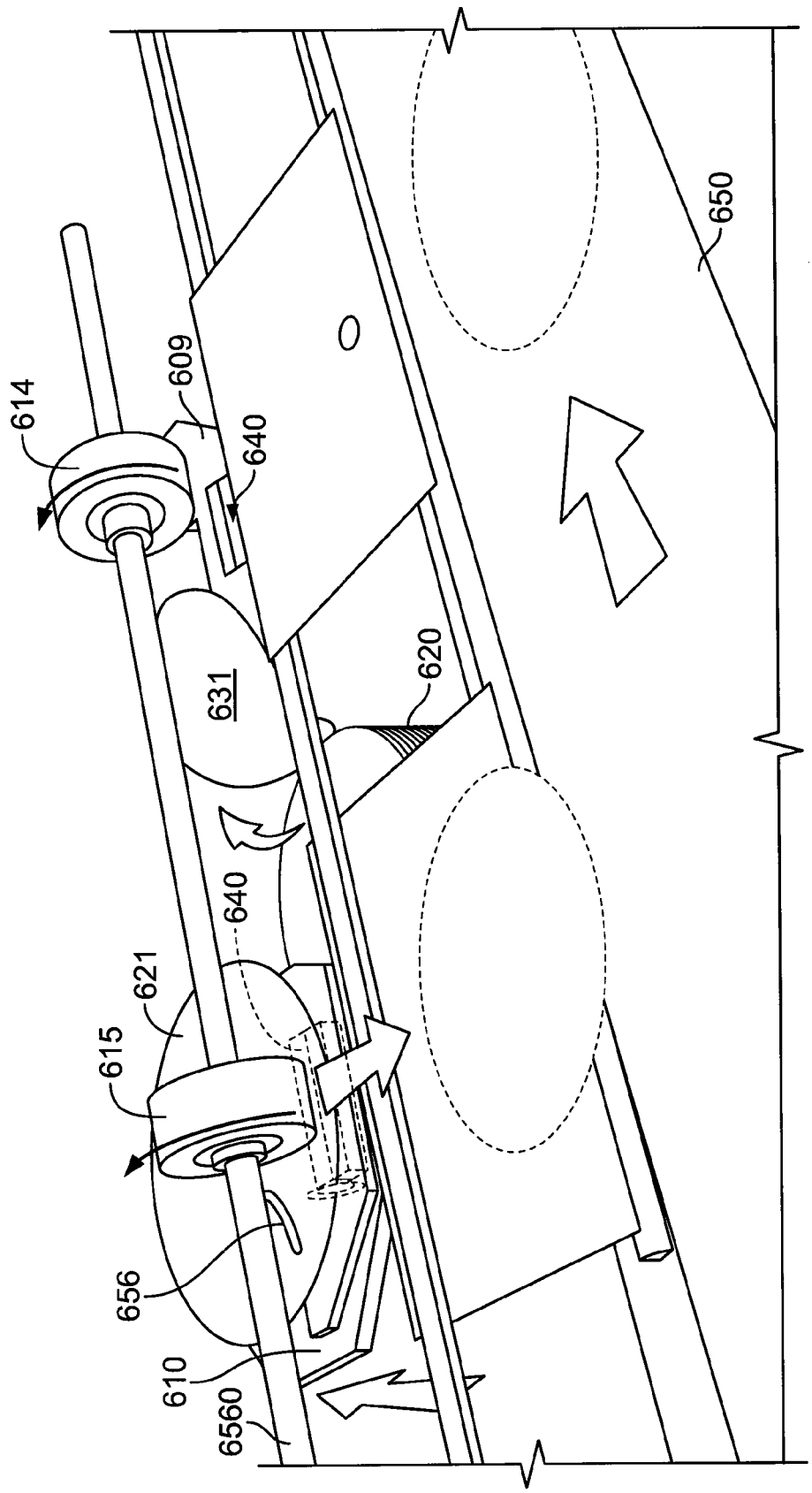
FIG. 23 is a top perspective view of the crust unstacker assembly of FIG. 16 showing lifted singulated crusts roller-transferred to a transport conveyor.

FIGS. 21-23 show a sequence of operations for unstacking a fluffed stack of crusts using the unstacker assembly of FIG. 16.

Referring to FIG. 21, the pick head 611 of picking mechanism 605 is depicted at a stage where it has already gripped an edge portion of the top crust 631 of the stack via suction gripper 627 (e.g., see FIG. 20), and is in the process of peeling the single crust 631 off the top of the stack 620 along direction 633 as the pick head 611 rolls across the stack 620. That is, crust 631 is releasably gripped at an edge portion thereof by a suction gripper 627 immediately before and while the pick head 611 rolls across the top surface of the stack 620 effective to grip and partly curl the picked crust 631 around the pick head 611 during rotation of the pick head 611 such that the crust 631 may be laterally transported to lift platform 609 for transfer thereon via temporary release of the suction force applied via the suction gripper 627. Direction arrow 632 shows the upward progressive movement of stack 620 provided by the previously discussed stack loader assembly 1100 during this procedure. Preferably, a controller 652 (see FIG. 16), which is described in greater detail below, is operable to send control signals to servo motors 655A-D (see FIG. 16) to accelerate the lateral motion of the pick head 611 after it contacts and suction grips an edge portion of a crust and as the pick head 611 traverses the top surface of the stack towards a lift platform, to help facilitate the crust peeling process.

Referring to FIG. 22, drive belts 613A and 613B (and similarly 613C and 613D) controllably move the picking mechanism 605 in the direction 636 towards lift platform 609. The lift platform 609 is operable to move downwards to receive crust 631 when released and transferred from the pick head 611, and thereafter lift the crust into contact with a transfer device 614, as indicated by the hatched direction arrows 637, 638, and 639, respectively. It will be appreciated that the unstacker assembly 600 is also operable such that a failure of the pick head to grip a given food product when passing across the food product in one lateral direction is followed by gripping the same food product during a next pass of the pick head over the same food product in the opposite lateral direction.

Referring to FIG. 23, after crust 631 is transferred to lift mechanism 609, it is transferred to conveyor 650 via overhead roller 614. As illustrated, crust 621, which was previously transferred to lift platform 610 in a previous pick cycle, is pushed onto conveyor 650 by action of the drive roller 615. The transfer is facilitated by the provision of a freely rotatable pairing of rollers 640 provided in the lift platform 610 (and similarly in platform 609), which create a nip with overhead roller 615. Once the crust 631 is transferred to lift platform 609, drive belts 613A-D will translate the picking mechanism 605 back across the opening 603 to pick up the next crust from the top of the stack 620 in a similar manner for transport and transfer to the opposite lift platform 610 in a similar fashion. This unstacking operation is repeated as long as needed to supply singulated crusts to downstream handling operations, which are described in more detail below. A back stop means 656, such as a curved self-supporting yet flexible hose segment, may be provided which extends downward from rigid shaft 6560 or a neighboring fixture towards and terminating in close spaced proximity to the upper surface of platform 610 (and similarly at platform 609), which can be used to help stop and knock-down a crust upon platform 610 after its release from pick head 611.

Referring to FIG. 16, to coordinate the above-described movements of the drive belts 613A-D, the picking mechanism 605, and lifting platforms 609 and 610, a position controller 652 controls and drives a servo motor moving 655A-D which are located on opposite lateral sides of the unstacker assembly 600. The controller 652 is used as a servo driver. The servo motor for 655A-D is connected to one side of the picking mechanism 605 via a single drive belt 613A-D, respectively, or other tensioning element(s) adapted to be wound/unwound upon a servo motor spool (not shown). An encoder is also provided operable to directly or indirectly track the position of the pick head 611, so that suction is drawn through suction grippers 625 and 627, and released, at appropriate times during each pick and transfer cycle. For instance, one or more of the servo motors 655A-D may also drive an encoder 658A-D, respectively, for detecting, monitoring, and controlling the position and motion of the drive belts 613A-D, and also the pick head 611. The controller 652 preferably electronically controls the position of the servo motors 655A-D via two-way signal communication lines 657A-D, such as indicated in FIG. 16. These communication lines may be hard wired or wireless (e.g., radio frequency). The controller 652 may be in the form of a dedicated chip or a portion of a chip or the like, or of a programmable computer or the like, or virtually anything in between. The controller 652, of whatever type, may include or be connected to a user interface 654. The controller may have a look-up table with values stored therein that correspond to desired settings. The user may enter a desired food product diameter and/or type in the look-up table in the controller. The resulting values may then be used by the controller to determine and control the motion of the respective servomotors. Alternatively, the controller may calculate the required motion or position of the servomotors directly.

The up and down movement of lift platforms 609 and 610 also is integrated and coordinated with the movement, location and suction (vacuum) state of the pick head. For instance, controller 652 is operable to process encoder tracking data corresponding to the position of the pick head and send appropriate command signals to the lift platforms 609 and 610 as well as the servo drivers 655A-D and valving controlling vacuum pressure drawn at both suction devices 625 and 627. The individual example gripper mechanisms 625 and 627 also may be operated individually when selective gripping is desired, by selectively supplying the desired air pressure and vacuum to the individual gripper mechanisms. Although less desirable, other drive mechanisms, also may be used such as those relying on limit switches, stops and/or timing belts.

Figure 24:
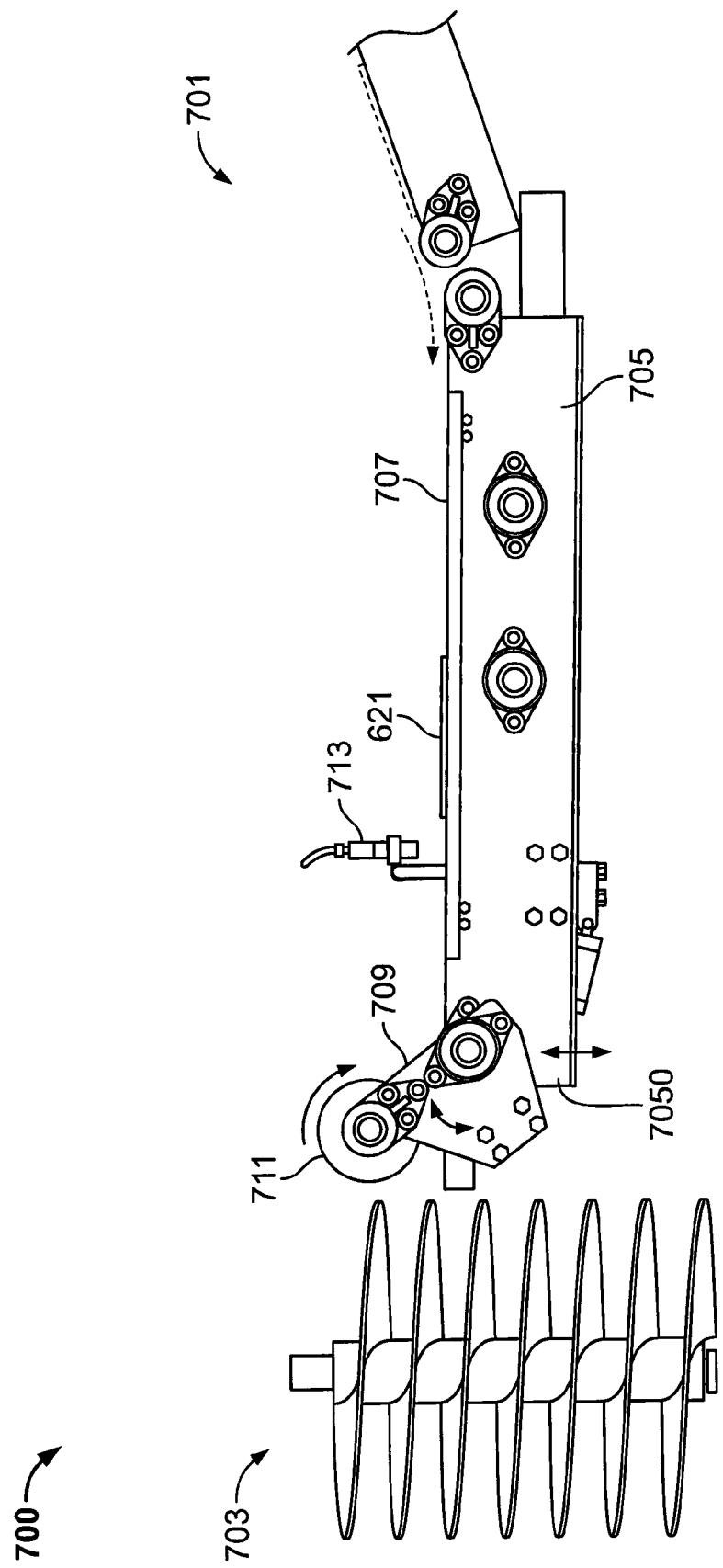
FIG. 24 is a side elevational view of an accumulator assembly according to an embodiment of the invention for regulating the pitch of the crusts.

Referring to FIG. 24, accumulator assembly 700 is illustrated which comprises a feeder assembly 701 and an auger assembly 703. The feeder assembly 701 receives singulated crusts from the unstacker assembly 600, such as via conveyor 650 (see FIG. 23) or singulated product directly fed from a different transport mechanism. The accumulator assembly 700 collects singulated crusts and deposits them on a discharge transport at uniform pitch to ready the crusts for subsequent processing such as topping dispensing, etc. It also lowers the singulated crusts back towards the plant floor in a controlled manner after they have been up-stacked for singulation in unstacker assembly 600.

The feeder assembly 701 comprises a frame 705, and a conveyor 707 on its upper surface for directing individual crusts 621 received from the unstacker assembly 600 or directly from some other transport mechanism through a tipple discharge assembly 709 which may include an overhead drive roller 711. The tipple discharge assembly 709 is adapted for controlled partial rocking motion towards and away from auger assembly 703, as indicated by the dual direction arrow. The trailing end 7050 of frame 705 also is equipped to move slightly up and down, as indicated by the dual direction arrow, in conjunction with the rocking motion of the tipple discharge assembly 709.

Figure 25:
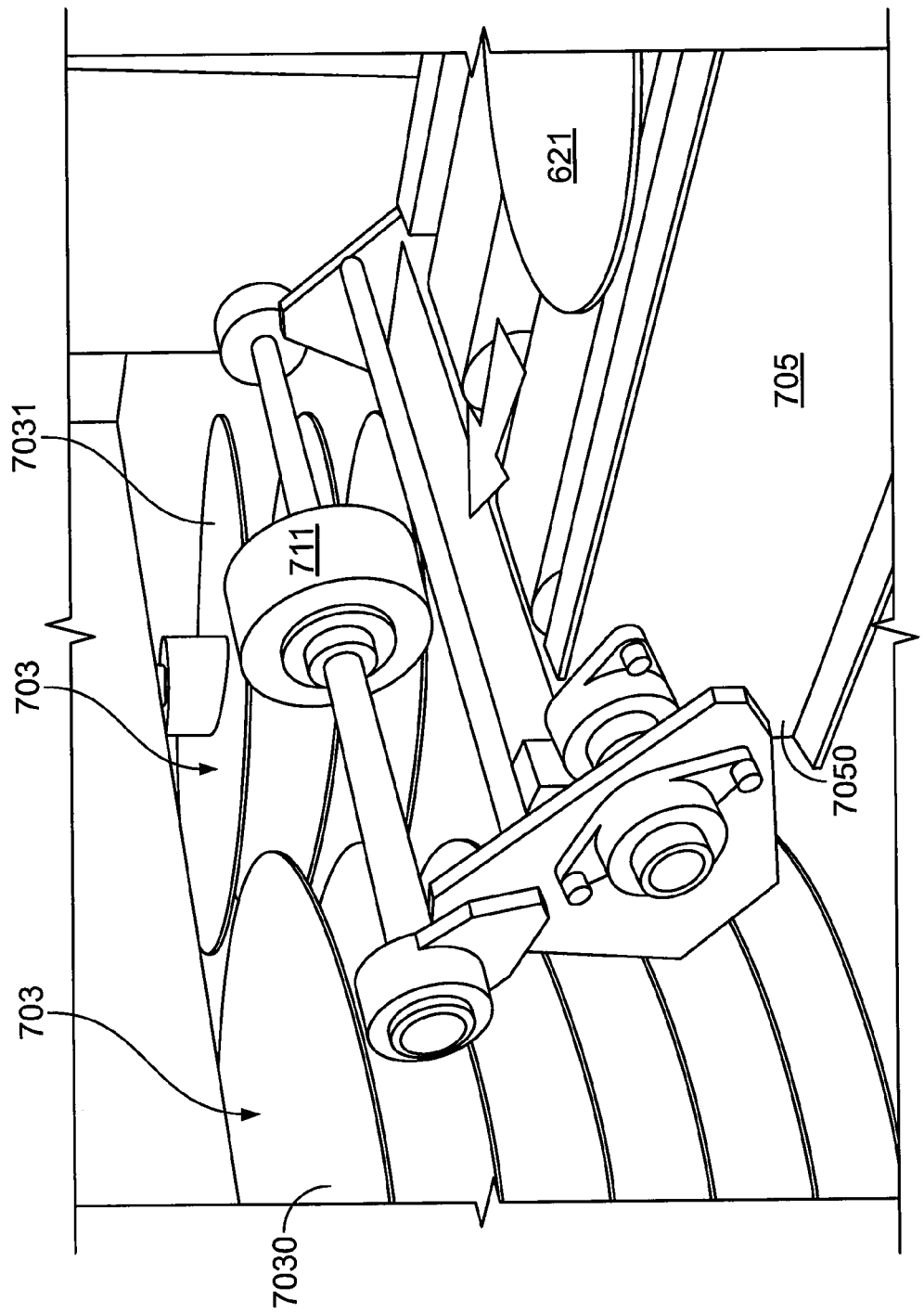
FIG. 25 a front perspective view of the crust accumulator assembly of FIG. 24.

Referring to FIG. 25, as the crust 621 approaches the trailing end 7050 of the frame 705 and the tipple discharge assembly 709 along the direction of advance indicated by the arrow, the trailing end 7050 of the frame 705 and the tipple discharge assembly 709 are in their upraised positions. As shown in FIG. 25, the auger assembly 703 is a dual-augered configuration including augers 7030 and 7031, which are described in more detail below.

Figure 26:
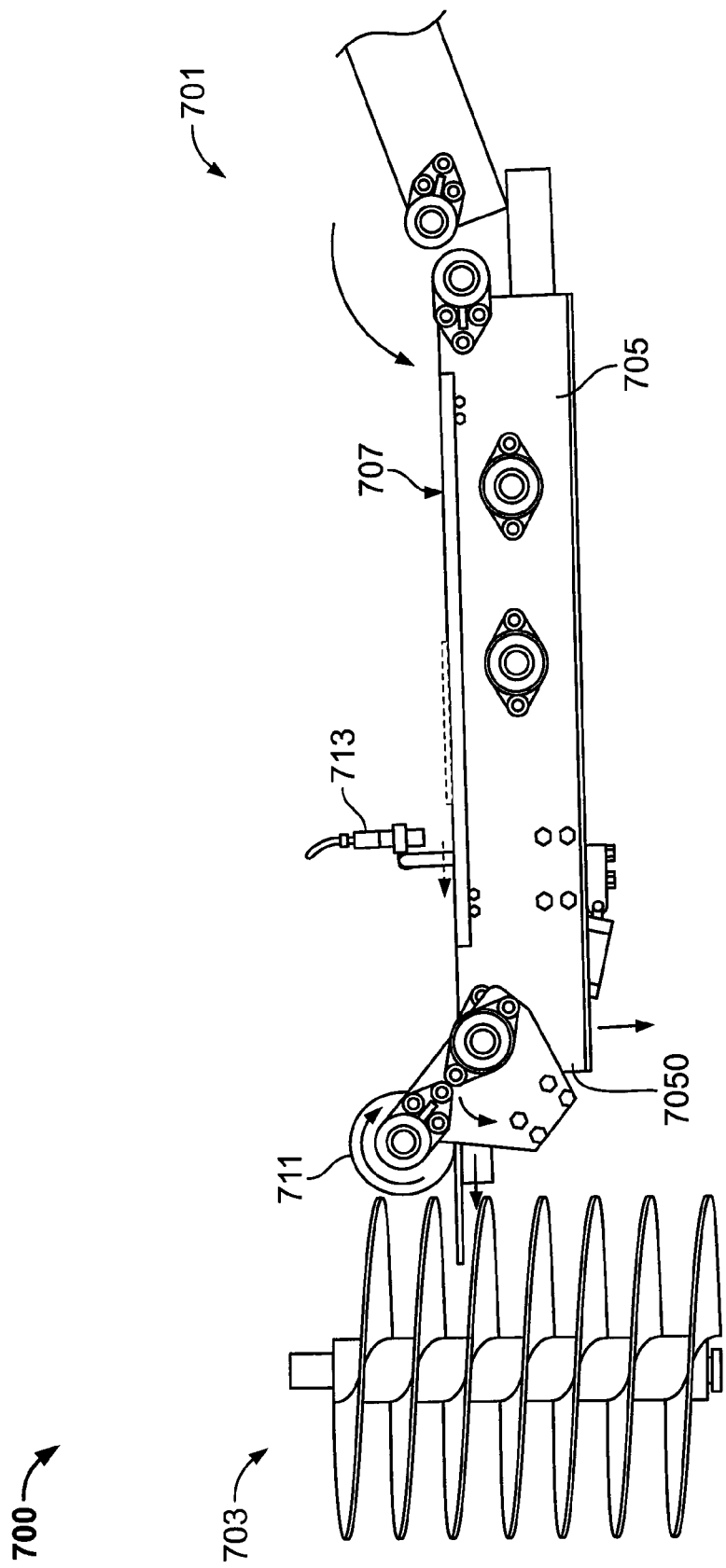
FIG. 26 is a side elevational view of the accumulator assembly of FIG. 24 at a later time sequence when a crust is being fed into an auger component thereof.

Referring to FIG. 26, the trailing end 7050 is slightly lowered as the crust passes over it, and tiltable discharge assembly 709 is rocked downward sufficient that overhead drive roller 711 makes contact with some upper surface portion of crust 621 effective to push it into an adjoining flight of auger assembly 703. Roller 711 and the supporting overhead mechanism is not required for all food products. It is never used on frozen crusts. Other crusts use it only if the crusts are being delivered at such a high speed that it is necessary to toss the crust in the accumulator rapidly.

Figure 27:
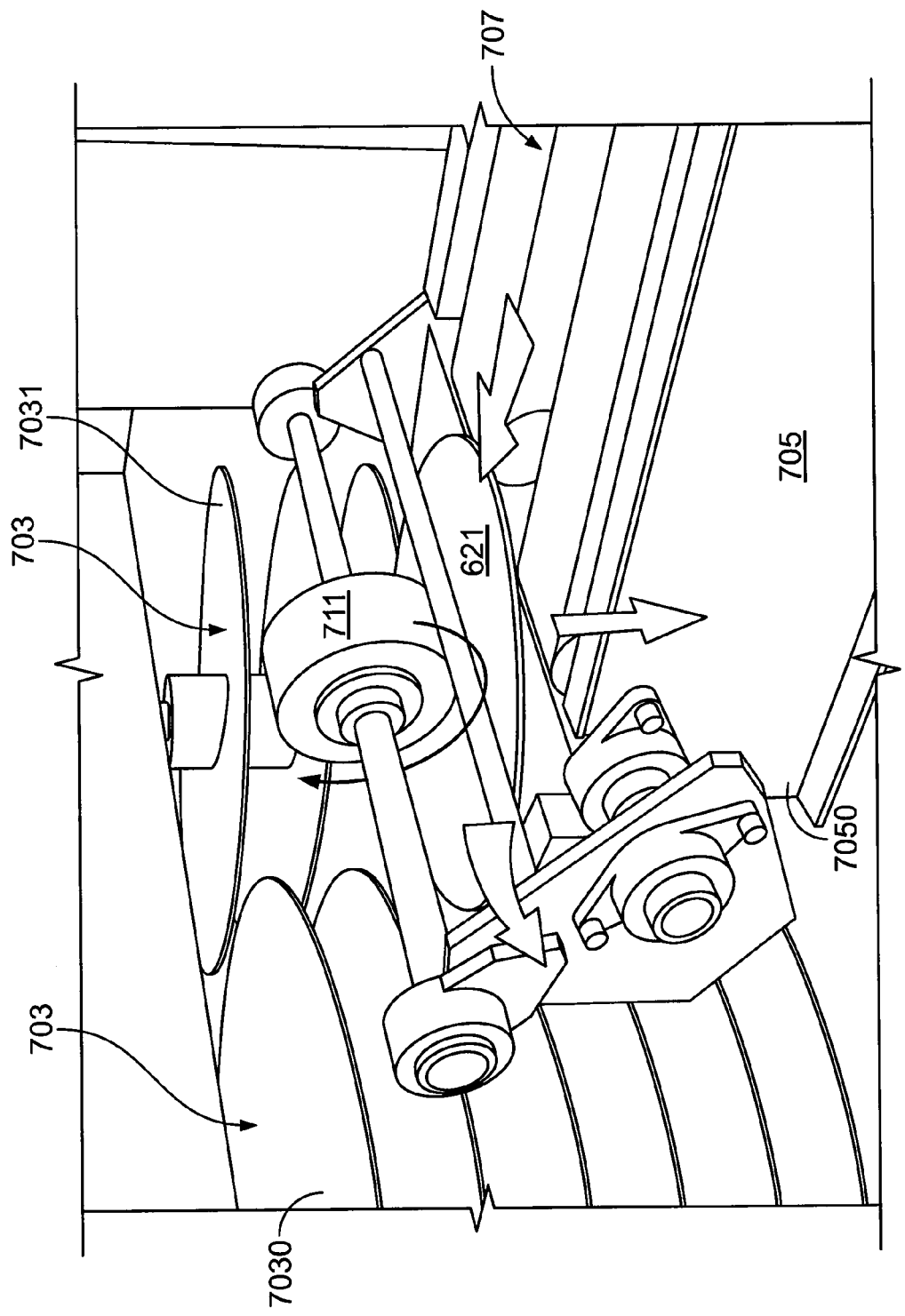
FIG. 27 is a front perspective view of the crust accumulator assembly of FIG. 26.

Referring to FIG. 27 shows crust 621 being pushed with the assistance of roller 711 into a flight of the auger assembly 703. These movements of the trailing end 7050 of the frame 705 and the tipple discharge assembly 709 are automatically executed. This can be done such as by providing a sensor 713, such as photoelectric sensor, which senses the presence and location of a crust on frame conveyor 707, from which signals can be inputted to a controller (not shown) which processes the signals and automatically issues appropriate commands to move the frame trailing end 7050 and tiltable discharge assembly 709 in an appropriate manner.

Figure 28:
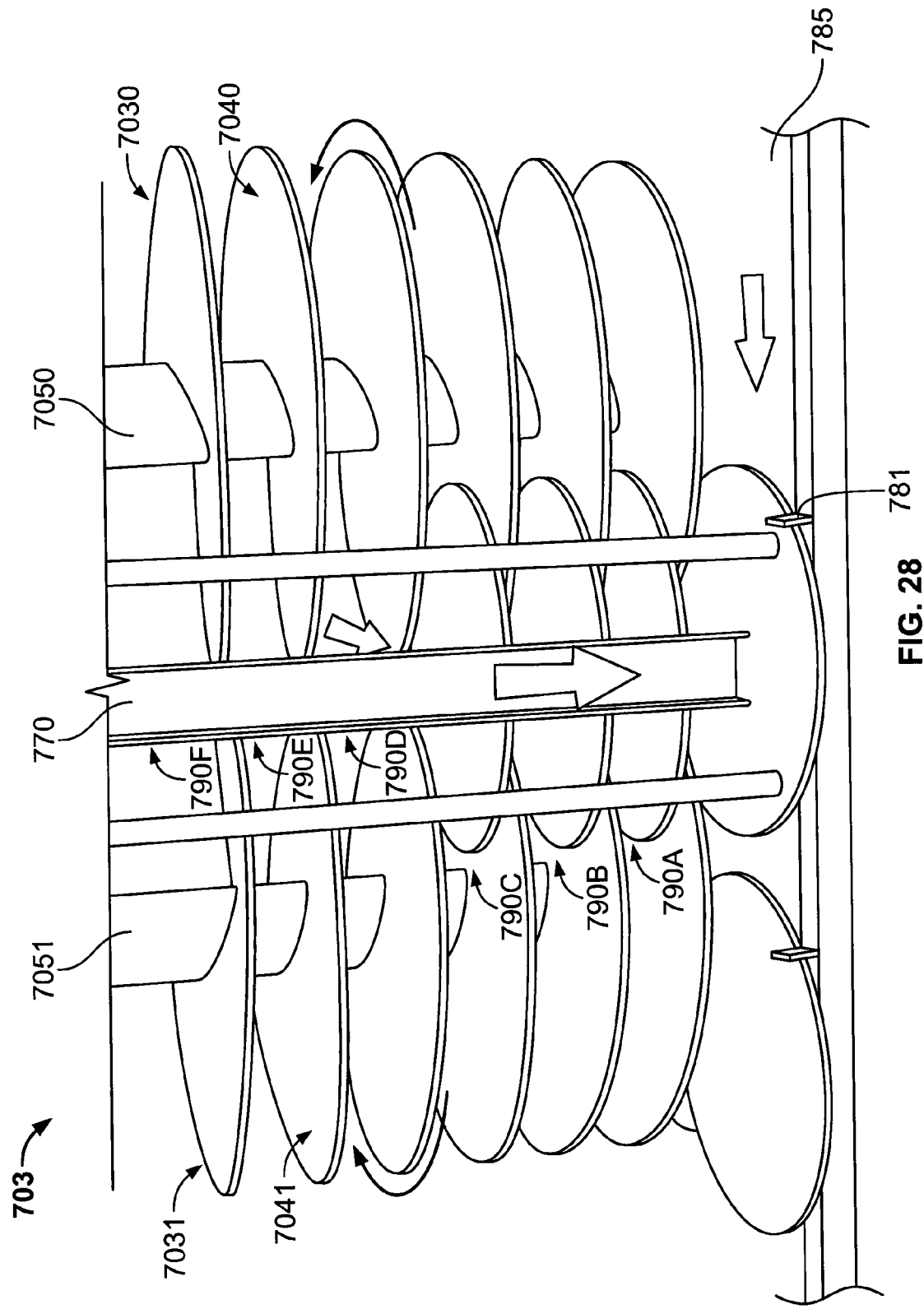
FIG. 28 is a rear view of the accumulator assembly of FIG. 24.

Referring to FIG. 28, the auger assembly 703 is illustrated as comprising a dual-auger conveyor arrangement in which a pair of augers 7030 and 7031 each comprise a multi-turn helicoid 7040 and 7041 mounted for rotation on generally vertically-oriented rotatable shaft 7050 and 7051, respectively. The augers 7030 and 7031 preferably share a common drive means (not shown), such as a drive belt, etc., which commonly drives the shafts 7050 and 6051 of both augers in timed relation to one another, in opposite directions of rotation as indicated in FIG. 28. The augers 7030 and 7031 are positioned in sufficiently close, yet spaced proximity, to co-define a plurality of vertically spaced-apart flights 790A-F composed of neighboring yet spaced apart disc surfaces located between the shafts 7050 and 7051 of the augers 7030 and 7031. The flights 790A-F are adapted to receive food products as shown in FIG. 28, as introduced by feeder assembly 701 in the manner described above. The augers 7030 and 7031 are located in sufficiently close, yet non-contacting, proximity to one another that crusts introduced into the auger assembly can remain self-supporting and not significantly sag in the air gap provided between the augers. Vertically-extending stop 770 provided in fixed position on a side opposite to the crust introduction side of the flights 790A-F is operable to delimit forward movement of crusts or other food products fed into the augers 7030 and 7031. As the augers 7030 and 7031 continuously rotate during the accumulation process, the rotary motion of the auger screws 7030, 7031 and back stop 770 act in combination to progressively lower crusts fed into the auger assembly 703 down successively lower flights in a controlled manner until they reach conveyor 785 having crust carrier flights 781 at a regular pitch (interval) along the conveyor. In this manner, crusts reach a transport means in substantially uniform pitch relative to other food products fed into the accumulator assembly. For accumulation of pizza crusts, the augers 7030 and 7031 preferably are smooth stainless steel or other smooth metallic construction, but also could be constructed of molded or shaped ceramic, plastic, fiber-reinforced plastic, etc. The number of flights may vary by application. The pitch angle determines the opening available to load the crust into the auger and the number of crusts in accumulation. If the pitch angle is too small, the crusts may not move down the auger assembly quickly enough to support normal production runs, while if it is too large the crusts may move down to rapidly to provide a stable accumulation system. Also, the feeder assembly 701 can be controlled to feed a crust into any given flight of the auger assembly 703. In addition, the pick head 611 of the unstacker assembly 600 is run at a varying rate to keep the accumulator assembly 700 full without overfilling. This ensures that the accumulator assembly 700 collects enough crusts so that crusts can be discharged therefrom at a uniform and uninterrupted pitch prior to subsequent processing, especially subsequent processing which may be sensitive to lack of uniform pitch such as food topping dispensing operations and/or packaging operations (e.g., placement of singulated crusts on cardboard backings and transport to a topping dispensing unit).

As indicated, although embodiments of this invention have been exemplified above in the context of handling pizza crusts, it will be appreciated that the invention has wider application to food products in general, especially discrete, generally self-supporting food products.

While the invention has been particularly described with specific reference to particular embodiments, it will be appreciated that various alterations, modifications and adaptations are intended to be within the spirit and scope of the invention as defined by the following claims.

What is claimed is:

1. A system for handling food products, comprising:
    a fluffer assembly comprising an engagement surface and a support member, the engagement surface being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products;
    an unstacker assembly comprising:
        a loader for receiving a fluffed stack of food products including a lifter operable to vertically raise the stack of food products through predetermined increments of distance;
        a picking mechanism including a rotary shaft, a pick head rotatably mounted on the rotary shaft, and respective rollers arranged on opposite sides of the pick head and on the rotary shaft, and the pick head including at least one suction device:
            operable for releasably applying suction to an edge portion of a food product resting on top of the stack of food products, and
            operable to peel a single food product from the top of the stack of food products during rolling movement of the pick head over the food product, and
            operable to releasably hold the peeled food product until released by temporarily relieving the suction;
        lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product for transfer of the food product to a conveyor; and
    an accumulator assembly operable for temporarily collecting a plurality of the food products received from the unstacker or other singulated source of product, the accumulator being configured for dispensing food products individually at an approximately regular pitch onto another conveyor.

2. The system according to claim 1, wherein the unstacker assembly further comprises a ramp upon which the picking mechanism rollers are supported for travel wherein the ramp includes a recessed track portion located above the stack loader and upraised track portions located adjacent the lift platforms.

3. The system according to claim 1, wherein first and second suction devices are associated with the pick head and are fixed for rotation therewith such that either of the suction devices can contact and suction grip an edge portion of a food product and hold the food product as the pick head is rolled over the top surface of the food product effective to peel a food product from the stack of food products.

4. The system according to claim 1, wherein the loader is operable to lift the stack of food products a predetermined distance in a synchronized manner such that after the pick head picks a food product, the loader is operable to upraise the stack of food products a predetermined distance effective that the next pass of the pick head contacts the upper surface of the next food product in the stack of food products.

5. The system according to claim 1, wherein the conveyor is operable to transport food products discharged from the accumulator assembly to a topping dispenser adapted to successively deposit food material upon the food products.

6. An apparatus for fluffing food products, comprising:
    an engagement surface and a support member, the engagement surface having a resilient cord mounted on an A-shaped frame member and being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products.

7. An apparatus for unstacking food products, comprising:
    a loader for receiving a stack of food products including a lifter operable to vertically raise the stack of food products through predetermined increments of distance;
    a picking mechanism including a rotary shaft, a pick head rotatably mounted on the rotary shaft, and respective rollers arranged on opposite sides of the pick head and on the rotary shaft, and the pick head including at least one suction device:
        operable for releasably applying suction to an edge portion of a food product resting on top of the stack of food products, and
        operable to peel a single food product from the top of the stack of food products during rolling movement of the pick head over the food product, and
        operable to releasably hold the peeled food product until released by temporarily relieving the suction; and
    lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product for transfer of the food product to a conveyor.

8. An apparatus for accumulating food products and dispensing them individually at an approximately regular pitch, comprising:
    a pair of augers each comprising a multi-turn helicoid mounted for rotation on a generally vertically-oriented rotatable shaft, wherein the augers are positioned in sufficiently close yet spaced proximity to co-define a plurality of vertically spaced-apart flights adapted to receive food products, the flights having a food product introduction side and an opposite side;
    a food product feeder operable to selectively transfer a food product onto any selected one of said flights;
    a vertically-extending stop disposed on the opposite side and being operable to delimit forward movement of food products fed into the augers, wherein the augers are operable for synchronized rotation whereupon a food product placed on a flight progressively moves down to lower flights; and a transport means receiving food products from the augers in substantially uniform pitch relative to other food products fed into the accumulator assembly.

9. A system for handling food products, comprising:
a fluffer assembly comprising an engagement surface and a support member, the engagement surface being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products;
an unstacker assembly comprising:
   a loader for receiving a fluffed stack of food products including a lifter operable to vertically raise the stack of food products through predetermined increments of distance;
   a picking mechanism including a rotary shaft, a pick head rotatably mounted on the rotary shaft, and respective rollers arranged on opposite sides of the pick head and on the rotary shaft, and the pick head including at least one suction device:
      operable for releasably applying suction to an edge portion of a food product resting on top of the stack of food products, and
      operable to peel a single food product from the top of the stack of food products during rolling movement of the pick head over the food product, and
      operable to releasably hold the peeled food product until released by temporarily relieving the suction;
lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product for transfer of the food product to a conveyor; and
an accumulator assembly operable for temporarily collecting a plurality of the food products received from the unstacker or other singulated source of product, the accumulator being configured for dispensing food products individually at an approximately regular pitch onto another conveyor,
wherein the fluffing engagement surface comprises elastic cord segments arranged transversely in spaced, approximately parallel relationship on the engagement surface.

10. A system for handling food products, comprising:
a fluffer assembly comprising an engagement surface and a support member, the engagement surface being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products;
an unstacker assembly comprising:
   a loader for receiving a fluffed stack of food products including a lifter operable to vertically raise the stack of food products through predetermined increments of distance;
   a picking mechanism including a rotary shaft, a pick head rotatably mounted on the rotary shaft, and respective rollers arranged on opposite sides of the pick head and on the rotary shaft, and the pick head including at least one suction device:
      operable for releasably applying suction to an edge portion of a food product resting on top of the stack of food products, and
      operable to peel a single food product from the top of the stack of food products during rolling movement of the pick head over the food product, and
      operable to releasably hold the peeled food product until released by temporarily relieving the suction;
lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product for transfer of the food product to a conveyor; and
an accumulator assembly operable for temporarily collecting a plurality of the food products received from the unstacker or other singulated source of product, the accumulator being configured for dispensing food products individually at an approximately regular pitch onto another conveyor,
wherein the fluffing assembly further comprises a first pneumatic cylinder operable to provide the lateral movement of the engagement surface against the side of the stack of food products, and a second pneumatic cylinder operable to provide the vertical movement of the engagement surface against the side of the stack of food products sufficient to separate adjoining food products of the stack of food products at their edge portions.

11. The system according to claim 10, wherein the fluffing assembly further comprises a holder member operable to pin an approximately central top region of the stack of food products in a fixed position during the vertical movement of the engagement surface.

12. A system for handling food products, comprising:
a fluffer assembly comprising an engagement surface and a support member, the engagement surface being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products;
an unstacker assembly comprising:
   a loader for receiving a fluffed stack of food products including a lifter operable to vertically raise the stack of food products through predetermined increments of distance;
   a picking mechanism including a rotary shaft, a pick head rotatably mounted on the rotary shaft, and respective rollers arranged on opposite sides of the pick head and on the rotary shaft, and the pick head including at least one suction device:
      operable for releasably applying suction to an edge portion of a food product resting on top of the stack of food products, and
      operable to peel a single food product from the top of the stack of food products during rolling movement of the pick head over the food product, and
      operable to releasably hold the peeled food product until released by temporarily relieving the suction;
lift platforms arranged on opposite lateral sides of the picking mechanism operable for reciprocal up-anddown movement, wherein the lift platforms are operable to move downwards to receive a food product transferred from the pick head upon release of suction at the suction device, and thereafter lift the food product for transfer of the food product to a conveyor; and an accumulator assembly operable for temporarily collecting a plurality of the food products received from the unstacker or other singulated source of product, the accumulator being configured for dispensing food products individually at an approximately regular pitch onto another conveyor, wherein the unstacker further being operable for providing reciprocal movement of the pick head back-and-forth across a top surface of the stack of food products in which individual food products may be successively releasably gripped at an edge portion thereof by the suction device while the pick head rolls across the top surface of the stack of food products effective to grip and at least partly curl a food product relative to the pick head during rotation of the pick head such that the food product is laterally transported to one or the other lift platform for transfer thereon via temporary release of the suction force applied via the suction device.

13. A system for handling food products, comprising:

a fluffer assembly comprising an engagement surface and a support member, the engagement surface being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products;

an unstacker assembly comprising:

a loader for receiving a fluffed stack of food products including a lifter operable to vertically raise the stack of food products through predetermined increments of distance;

a picking mechanism including a rotary shaft, a pick head rotatably mounted on the rotary shaft, and respective rollers arranged on opposite sides of the pick head and on the rotary shaft, and the pick head including at least one suction device:

operable for releasably applying suction to an edge portion of a food product resting on top of the stack of food products, and operable to peel a single food product from the top of the stack of food products during rolling movement of the pick head over the food product, and operable to releasably hold the peeled food product until released by temporarily relieving the suction;

lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product for transfer of the food product to a conveyor; and an accumulator assembly operable for temporarily collecting a plurality of the food products received from the unstacker or other singulated source of product, the accumulator being configured for dispensing food products individually at an approximately regular pitch onto another conveyor, wherein the pick head comprises a pair of integral wheels having a circumference larger than the diameter of the food product being picked up effective to enhance peeling action on the top food product relative to the stack of food products.

14. A system for handling food products, comprising:

a fluffer assembly comprising an engagement surface and a support member, the engagement surface being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products;

an unstacker assembly comprising:

a loader for receiving a fluffed stack of food products including a lifter operable to vertically raise the stack of food products through predetermined increments of distance;

a picking mechanism including a rotary shaft, a pick head rotatably mounted on the rotary shaft, and respective rollers arranged on opposite sides of the pick head and on the rotary shaft, and the pick head including at least one suction device:

operable for releasably applying suction to an edge portion of a food product resting on top of the stack of food products, and operable to peel a single food product from the top of the stack of food products during rolling movement of the pick head over the food product, and operable to releasably hold the peeled food product until released by temporarily relieving the suction;

lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product for transfer of the food product to a conveyor; and an accumulator assembly operable for temporarily collecting a plurality of the food products received from the unstacker or other singulated source of product, the accumulator being configured for dispensing food products individually at an approximately regular pitch onto another conveyor, the system further comprising a pick head position controller adapted to control servo motors located on opposite lateral sides of the picking mechanism, each servo motor connected to a side of the picking mechanism via at least one tension element adapted to be wound/unwound upon a servo motor spool, and an encoder operable to track the position of the pick head.

15. The system according to claim 14, wherein the controller being operable to send control signals to the servo motors to accelerate the lateral motion of the pick head after contacting and gripping a food product and as the pick head traverses the top surface of the food product.

16. The system according to claim 15, wherein controller being further operable to process encoder tracking data corresponding to the position of the pick head and send command signals to the controller and valving controlling vacuum pressure drawn at the at least one suction device.

17. A system for handling food products, comprising:

a fluffer assembly comprising an engagement surface and a support member, the engagement surface being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products;

an unstacker assembly comprising:
 a loader for receiving a fluffed stack of food products including a lifter operable to vertically raise the stack of food products through predetermined increments of distance;
 a picking mechanism including a rotary shaft, a pick head rotatably mounted on the rotary shaft, and respective rollers arranged on opposite sides of the pick head and on the rotary shaft, and the pick head including at least one suction device:
  operable for releasably applying suction to an edge portion of a food product resting on top of the stack of food products, and
  operable to peel a single food product from the top of the stack of food products during rolling movement of the pick head over the food product, and
  operable to releasably hold the peeled food product until released by temporarily relieving the suction;
 lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product for transfer of the food product to a conveyor; and
 an accumulator assembly operable for temporarily collecting a plurality of the food products received from the unstacker or other singulated source of product, the accumulator being configured for dispensing food products individually at an approximately regular pitch onto another conveyor,
wherein the lift platforms are associated with an overhead roller operable to push the food product onto an adjoining conveyor line.

18. A system for handling food products, comprising:
a fluffer assembly comprising an engagement surface and a support member, the engagement surface being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products;
an unstacker assembly comprising:
 a loader for receiving a fluffed stack of food products including a lifter operable to vertically raise the stack of food products through predetermined increments of distance;
 a picking mechanism including a rotary shaft, a pick head rotatably mounted on the rotary shaft, and respective rollers arranged on opposite sides of the pick head and on the rotary shaft, and the pick head including at least one suction device:
  operable for releasably applying suction to an edge portion of a food product resting on top of the stack of food products, and
  operable to peel a single food product from the top of the stack of food products during rolling movement of the pick head over the food product, and
  operable to releasably hold the peeled food product until released by temporarily relieving the suction;
 lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product for transfer of the food product to a conveyor; and
 an accumulator assembly operable for temporarily collecting a plurality of the food products received from the unstacker or other singulated source of product, the accumulator being configured for dispensing food products individually at an approximately regular pitch onto another conveyor,
wherein the unstacker assembly further being operable such that failure of the pick head to grip a given food product when passing across the food product in one lateral direction is followed by gripping the same food product during a next pass of the pick head over the same food product in the opposite lateral direction.

19. A system for handling food products, comprising:
a fluffer assembly comprising an engagement surface and a support member, the engagement surface being adapted for making lateral and vertical movement relative to a stack of food products with opposite side portions, the engagement surface being operable to compressively contact a side portion of the stack of food products and effective to bend and separate edge portions of adjoining food products in the stack of food products while the support member retains the opposite side portion of the stack of food products;
an unstacker assembly comprising:
 a loader for receiving a fluffed stack of food products including a lifter operable to vertically raise the stack of food products through predetermined increments of distance;
 a picking mechanism including a rotary shaft, a pick head rotatably mounted on the rotary shaft, and respective rollers arranged on opposite sides of the pick head and on the rotary shaft, and the pick head including at least one suction device:
  operable for releasably applying suction to an edge portion of a food product resting on top of the stack of food products, and
  operable to peel a single food product from the top of the stack of food products during rolling movement of the pick head over the food product, and
  operable to releasably hold the peeled food product until released by temporarily relieving the suction;
 lift platforms arranged on opposite lateral sides of the picking mechanism operable for reciprocal up-and-down movement, wherein the lift platforms are operable to move downwards to receive a food product transferred from the pick head upon release of suction at the suction device, and thereafter lift the food product for transfer of the food product to a conveyor; and
 an accumulator assembly operable for temporarily collecting a plurality of the food products received from the unstacker or other singulated source of product, the accumulator being configured for dispensing food products individually at an approximately regular pitch onto another conveyor,
wherein the accumulator assembly further comprises:
 a pair of augers each comprising a multi-turn helicoid mounted for rotation on a generally vertically-oriented rotatable shaft, wherein the augers are positioned in sufficiently close yet spaced proximity to co-define a plurality of vertically spaced-apart flights adapted to receive food products;

a vertically-extending stop on a side opposite to a food product introduction side of the flights which is operable to delimit forward movement of food products fed into the augers, wherein the adjacent augers are operable for synchronized rotation whereupon a food product placed on a flight progressively moves down to lower flights until reaching a transport means in substantially uniform pitch relative to other food products fed into the accumulator assembly; and a food product feeder operable to selectively transfer a food product onto any selected one of said flights.

* * * * *